(12) United States Patent
Weishaupt et al.

(10) Patent No.: US 11,693,692 B2
(45) Date of Patent: Jul. 4, 2023

(54) PROGRAM EVENT RECORDING STORAGE ALTERATION PROCESSING FOR A NEURAL NETWORK ACCELERATOR INSTRUCTION

(71) Applicant: INTERNATIONAL BUSINESS MACHINES CORPORATION, Armonk, NY (US)

(72) Inventors: Simon Weishaupt, Stuttgart (DE); Anthony Saporito, Highland, NY (US); Timothy Slegel, Staatsburg, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 195 days.

(21) Appl. No.: 17/350,365

(22) Filed: Jun. 17, 2021

(65) Prior Publication Data
US 2022/0405120 A1 Dec. 22, 2022

(51) Int. Cl.
*G06F 9/48* (2006.01)
*G06N 3/08* (2023.01)
*G06F 9/50* (2006.01)

(52) U.S. Cl.
CPC .......... *G06F 9/4812* (2013.01); *G06F 9/5016* (2013.01); *G06N 3/08* (2013.01)

(58) Field of Classification Search
CPC ........ G06F 9/4812; G06F 9/5016; G06N 3/08
See application file for complete search history.

(56) References Cited

U.S. PATENT DOCUMENTS 3,689,701 A * 9/1972 Bosonnet ........... H04Q 11/0407
370/384
5,761,105 A 6/1998 Goddard et al.
(Continued)

FOREIGN PATENT DOCUMENTS

CN 107016175 A 8/2017
CN 110766135 A 2/2020
(Continued)

OTHER PUBLICATIONS

IBM, "z/Architecture—Principles of Operation," IBM Publication No. SA22-7832-12, Thirteenth Edition, Sep. 2019, pp. 1-2000.
(Continued)

*Primary Examiner* — Zachary K Huson
(74) *Attorney, Agent, or Firm* — Edward J. Wixted, III, Esq.; Blanche E. Schiller, Esq.; Heslin Rothenberg Farley & Mesiti P.C.

(57) ABSTRACT

Instruction processing is performed for an instruction. The instruction is configured to perform a plurality of functions, in which a function of the plurality of functions is to be performed in a plurality of processing phases. A processing phase is defined to store up to a select amount of data. The select amount of data is based on the function to be performed. At least one function of the plurality of functions has a different value for the select amount of data than at least one other function. A determination is made as to whether a store into a designated area occurred based on processing a select processing phase of a select function. Based on determining that the store into the designated area occurred, an interrupt is presented, and based on determining that the store into the designated area did not occur, instruction processing is continued.

20 Claims, 16 Drawing Sheets

(56) References Cited

U.S. PATENT DOCUMENTS

| | | | |
|---|---|---|---|
| 8,291,003 | B2 | 10/2012 | Boersma et al. |
| 9,600,345 | B1 | 3/2017 | Cropper et al. |
| 9,836,691 | B1 | 12/2017 | Narayanaswami et al. |
| 9,940,101 | B2 | 4/2018 | Ahmed et al. |
| 9,959,498 | B1 | 5/2018 | Narayanaswami et al. |
| 10,185,708 | B2 | 1/2019 | Miller et al. |
| 10,204,093 | B2 | 2/2019 | Miller et al. |
| 10,338,925 | B2 | 7/2019 | Flowers et al. |
| 10,379,814 | B2 | 8/2019 | Ahmed et al. |
| 10,387,366 | B2 | 8/2019 | Henry et al. |
| 10,460,230 | B2 | 10/2019 | Brothers et al. |
| 10,552,199 | B2 | 2/2020 | Franciosi |
| 10,558,588 | B2 | 2/2020 | Rozas et al. |
| 10,558,599 | B2 | 2/2020 | Staudenmaier et al. |
| 10,620,951 | B2 | 4/2020 | Azizi et al. |
| 10,623,386 | B1 | 4/2020 | Bernat et al. |
| 10,642,835 | B2 | 5/2020 | Orad et al. |
| 10,656,913 | B2 | 5/2020 | Mueller et al. |
| 10,699,465 | B1 | 6/2020 | Surti et al. |
| 10,726,328 | B2 | 7/2020 | Ling et al. |
| 10,726,329 | B2 | 7/2020 | Lie et al. |
| 10,728,169 | B1 | 7/2020 | McClenahan et al. |
| 10,778,707 | B1 | 9/2020 | Rastogi |
| 10,789,402 | B1 | 9/2020 | Vemuri et al. |
| 10,802,992 | B2 | 10/2020 | Yu et al. |
| 10,810,484 | B2 | 10/2020 | Xie et al. |
| 10,817,042 | B2 | 10/2020 | Desai et al. |
| 10,824,939 | B2 | 11/2020 | Fang et al. |
| 10,832,137 | B2 | 11/2020 | Baker et al. |
| 10,832,139 | B2 | 11/2020 | Yan et al. |
| 10,860,315 | B2 | 12/2020 | Malladi et al. |
| 10,885,277 | B2 | 1/2021 | Ravi et al. |
| 10,891,538 | B2 | 1/2021 | Dally et al. |
| 11,513,818 | B1* | 11/2022 | Chen .................. G06F 9/44521 |
| 2014/0059542 | A1 | 2/2014 | Ashok et al. |
| 2017/0103304 | A1 | 4/2017 | Henry et al. |
| 2018/0046913 | A1 | 2/2018 | Yu et al. |
| 2018/0121796 | A1 | 5/2018 | Deisher et al. |
| 2018/0322386 | A1 | 11/2018 | Sridharan et al. |
| 2018/0341483 | A1 | 11/2018 | Fowers et al. |
| 2019/0042241 | A1 | 2/2019 | Akin |
| 2019/0079885 | A1 | 3/2019 | Staudenmaier et al. |
| 2019/0095212 | A1 | 3/2019 | Yang |
| 2019/0147323 | A1 | 5/2019 | Li et al. |
| 2019/0205737 | A1 | 7/2019 | Bleiweiss et al. |
| 2019/0213005 | A1 | 7/2019 | Temam et al. |
| 2019/0324759 | A1 | 10/2019 | Yang et al. |
| 2019/0340499 | A1 | 11/2019 | Burger et al. |
| 2019/0384370 | A1 | 12/2019 | Kim et al. |
| 2020/0005143 | A1 | 1/2020 | Zamora Esquival et al. |
| 2020/0042860 | A1 | 2/2020 | Sun et al. |
| 2020/0074293 | A1 | 3/2020 | Chin et al. |
| 2020/0104287 | A1 | 4/2020 | Regev |
| 2020/0117369 | A1 | 4/2020 | Pelster et al. |
| 2020/0193274 | A1 | 6/2020 | Darvish Rouhani et al. |
| 2020/0218985 | A1 | 7/2020 | Wei et al. |
| 2020/0242189 | A1 | 7/2020 | Chatterjee et al. |
| 2020/0257467 | A1* | 8/2020 | Drego ..................... G06F 5/065 |
| 2020/0264876 | A1 | 8/2020 | Lo et al. |
| 2020/0285933 | A1 | 9/2020 | Zhang |
| 2020/0310761 | A1 | 10/2020 | Rossi et al. |
| 2020/0349094 | A1 | 11/2020 | Smith et al. |
| 2020/0387772 | A1 | 12/2020 | Zheng et al. |
| 2020/0401350 | A1 | 12/2020 | Kannan et al. |
| 2020/0401873 | A1 | 12/2020 | Lin et al. |
| 2020/0410327 | A1 | 12/2020 | Chinya et al. |
| 2020/0410337 | A1 | 12/2020 | Huang et al. |
| 2021/0004668 | A1 | 1/2021 | Moshovos et al. |
| 2021/0011846 | A1 | 1/2021 | Venkatesh et al. |
| 2021/0019618 | A1 | 1/2021 | Ross et al. |
| 2022/0300784 | A1* | 9/2022 | Kawabe ................. G06N 3/048 |

FOREIGN PATENT DOCUMENTS

| | | | |
|---|---|---|---|
| CN | 111126583 | A | 5/2020 |
| CN | 111353595 | A | 6/2020 |
| EP | 3736692 | A1 | 11/2020 |
| WO | WO2018080617 | A1 | 3/2018 |
| WO | WO2019140067 | A2 | 8/2019 |

OTHER PUBLICATIONS

Mell, Peter and Tim Grance, "The NIST Definition of Cloud Computing," National Institute of Standards and Technology, Information Technology Laboratory, Special Publication 800-145, Sep. 2011, pp. 1-7.

Anonymous, "Method and Circuit for Implementing Hyperbolic Tangent Activation Function in Neural Network Accelerators," IPCOM000254761D, Jul. 30, 2018, pp. 1-2 (+ cover).

Anonymous, "Determining Priority Value of Processes Based on Usage History," IPCOM000252344D, Jan. 5, 2018, pp. 1-38 (+ cover).

Gao, Chang et al., "EdgeDRNN: Recurrent Neural Network Accelerator for Edge Inference," IEEE Journal on Emerging and Selected Topics in Circuits and Systems, vol. 10, No. 4, Dec. 2020, pp. 419-432.

Agrawal, Ankur et al., "DLFloat: A 16-b Floating Point Format Designed For Deep Learning Training and Interference," 2019 IEEE 26th Symposium on Computer Arithmetic (ARITH), Jun. 2019, pp. 1-23.

Chen et al.; "Eyriss v2: A Flexible Accelerator For Emerging Deep Neural Networks On Mobile Devices", Cornell University Library, arXiv:1807.07928v2, pp. 1-21, May 20, 2019.

Eldridge et al.; "Towards General-Purpose Neural Network Computing", Harvard Library, PACT'15 International Conference On, pp. 1-15, Oct. 18-21, 2015.

Han et al.; "Accelerating Event Detection With DGCNN And FPGAs", Electronics, vol. 9, Issue 10, pp. 1-19, Oct. 13, 2020.

Sen et al.; "SPARCE: Sparsity Aware General Purpose Core Extension To Accelerate Deep Neural Networks", Cornell University Library, arXiv:1711.06351v2, pp. 1-13, Nov. 29, 2017.

Wu et al.; "A Reconfigurable Convolutional Neural Network-Accelerated Coprocessor Based On RISC-V Instruction Set", Electronics, vol. 9, Issue 6, pp. 1-19, Jun. 16, 2020.

Anonymous, "Automatically Scaling Multi-Tenant Machine Learning," IPCOM000252098D, Dec. 15, 2017, pp. 1-34 (+ cover).

Edelen, A.L. et al., "Neural Networks for Modeling and Control of Particle Accelerators," IEEE Transactions on Nuclear Science, vol. 63, Issue 2, Apr. 2016, pp. 1-21.

Guo, Kaiyuan et al., "A Survey of FPGA Based Neural Network Accelerator," Dec. 24, 2017, 11:1-11:22.

Ming, Andre Xian et al., "Hardware Accelerators for Recurrent Neural Networks on FPGA," 2017 IEEE International Symposium on Circuits and Systems (ISCAS), May 28, 2017, pp. 1-4.

Schabel, Joshua Chris, "Design of an Application-Specific Instruction Set Processor for the Sparse Neural Network Design Space," 2018 (no further date information available), pp. 1-270.

Yuksel, Kivanc et al., "Deep Alignment Network: from MIMD to SIMD Platform," Oct. 2018, pp. 1-9.

Zhu, Maohua et al., "Taming Unstructured Sparsity on GPUs via Latency-Aware Optimization," Jan. 2020, pp. 1-6.

Allen-Bradley, "Converting PLC-5 or SLC 500 Logic to Logix-Based Logic—Reference Manual," Publication No. 1756-RM085B-EN-P, Nov. 2001, pp. 1-80.

Anonymous, "Datatype Translation in the Presence of Static and Dynamic Types and Untyped Data," IPCOM000185632D, Jul. 29, 2009, pp. 1-5 (+ cover).

Anonymous, "High Performance Data Format Conversion Using Semantic Mapping Model and Canonical Data Formats," IPCOM000125715D, Jun. 14, 2005, pp. 1-4 (+ cover).

Anonymous, "Intrinsic and Hardware Instruction Format and the Handling Thereof, for Sine, Cosine and Sincos Functions with User Defined Accuracy," IPCOM000239915D, Dec. 2014, p. 1 (+ cover).

(56) References Cited

OTHER PUBLICATIONS

Chen, Dongdong et al., "A 32-Bit Decimal Floating-Point Logarithmic Converter," Jun. 2009, pp. 1-10 (+ cover).
Amonymous, "Live Virtual Machine Migration Across Hypervisor Systems By Leveraging the Commonality in Memory Contents of To-Be Migrated VM and of VMs Hosted on Destination Hypervisor," IPCOM000217990D, May 15, 2012, pp. 1-2 (+ cover).
Bafna, Mukesh, "Method and Apparatus to Generically Detect Use Cases Like Live Migration of Virtual Machine," IPCOM000230880D, Sep. 17, 2013, pp. 1-4 (+ cover).
Informatica, "The Five Pitfalls of Data Migration—and How to Avoid Them," Jun. 2010, pp. 1-16.
Reid-Miller, Margaret, "Primitive Data Types," Summer 2010 (no further date information available), pp. 1-24.
Anonymous, "Identifying and Determining Trustworthiness of a Machine-Learned Model," IPCOM000252359D, Jan. 2018, pp. 1-34 (+ cover).
Guo, Wanwu et al., "A Neural Network-Based Data Managing and Manipulating System," School of Computer and Information Science, (No Date Information Available), pp. 1-6.
Kuang, Hongyu et al., "Automated Data-Processing Function Identification Using Deep Neural Network," College of Electronic Science, National University of Defense Technology, vol. 4, 2016 (no further date information available), pp. 1-14.
Smieja, Marek et al., "Processing of Missing Data by Neural Networks," 32$^{nd}$ Conference on Neural Information Processing Systems, Dec. 2018, pp. 1-11.
Guo, Cong et al., "Balancing Efficiency and Flexibility for DNN Acceleration via Temporal GPU-Systolic Array Integration," Jan. 2020, pp. 1-6.
Dhillon, et al., "Determining Priority Value of Processes Based on Usage History," IPCOM000252344D, Jan. 5, 2018, pp. 1-38 (+ cover).
Zhao, Tian et al., "Serving Recurrent Neural Networks Efficiently with a Spatial Accelerator," Sep. 26, 2019, pp. 1-12.
Anonymous, "Human-Style Text Parsing System," IPCOM000254954D, Aug. 16, 2018, pp. 1-12 (+ cover).
Shawahna, Ahmad et al., "FPGA-based Accelerators of Deep Learning Networks for Learning and Classification: A Review," IEEE Access, vol. 4, 2016 (no further date information available), pp. 1-41.
Anonymous, "Efficient Accelerators for Matrix Multiplication in Machine Learning," IPCOM000243676D, Oct. 9, 2015, pp. 1-3 (+ cover).
Anonymous, "Register Allocation for a RegX Accelerator that Supports Multi-Register Resets," IPCOM000219037D, Jun. 18, 2012, pp. 1-2 (+ cover).
Mittal, Sparsh et al., "A Survey of Encoding Techniques for Reducing Data-Movement Energy," Journal of Systems Architecture, Nov. 2018, pp. 1-38.
Sato, Shimpei, et al., "BRein Memory: A Single-Chip Binary/Ternary Reconfigurable in-Memory Deep Neural Network Accelerator Achieving 1.4 TOPS at 0.5 W," IEEE Journal of Solid-State Circuits, vol. 53, No. 4, Apr. 2018, pp. 983-994.
Cai, Chenghao et al., "Deep Neural Networks with Multistate Activation Functions," Hindawi Publishing Corporation, Computational Intelligence and Neuroscience, vol. 2015, Article ID 721367, Aug. 2015, pp. 1-10.
Gao, Chang et al., "DeltaRNN: A Power-efficient Recurrent Neural Network Accelerator," University of Zurich—Zurich Open Repository and Archive, Feb. 2018, pp. 21-30.
Kang, Hyeong-Ju, "Accelerator-Aware Pruning for Convolutional Neural Networks," IEEE Transactions on Circuits and Systems for Video Technology, vol. 30, Issue 7, Jul. 2020, pp. 1-11.
Nanni, Loris et al., "Stochastic Selection of Activation Layers for Convolutional Neural Networks," Sensors, Mar. 14, 2020, pp. 1-15.
PCT International Search Report and Written Opinion of the International Searching Authority, PCT/IB2022/055449, dated Sep. 26, 2022, 8 pages.

\* cited by examiner

300

NEURAL NETWORK
PROCESSING ASSIST

302

GENERAL REGISTER 0

310    312    314

314

| CODE (DEC) | CODE (HEX) | FUNCTION | PARAMETER BLOCK SIZE (BYTES) |
|---|---|---|---|
| 0 | 0 | NNPA - QAF | 256 |
| 16 | 10 | NNPA - ADD | 4096 |
| 17 | 11 | NNPA - SUB | 4096 |
| 18 | 12 | NNPA - MUL | 4096 |
| 19 | 13 | NNPA - DIV | 4096 |
| 20 | 14 | NNPA - MIN | 4096 |
| 21 | 15 | NNPA - MAX | 4096 |
| 32 | 20 | NNPA - LOG | 4096 |
| 33 | 21 | NNPA - EXP | 4096 |
| 49 | 31 | NNPA - RELU | 4096 |
| 50 | 32 | NNPA - TANH | 4096 |
| 51 | 33 | NNPA - SIGMOID | 4096 |
| 52 | 34 | NNPA - SOFTMAX | 4096 |
| 64 | 40 | NNPA - BATCHNORM | 4096 |
| 80 | 50 | NNPA - MAXPOOL2D | 4096 |
| 81 | 51 | NNPA - AVGPOOL2D | 4096 |
| 96 | 60 | NNPA - LSTMACT | 4096 |
| 97 | 61 | NNPA - GRUACT | 4096 |
| 112 | 70 | NNPA - CONVOLUTION | 4096 |
| 113 | 71 | NNPA - MATMUL-OP | 4096 |
| 114 | 72 | NNPA - MATMUL-OP-BCAST23 | 4096 |

FIG. 3C

GENERAL REGISTER 1

350

PARAMETER BLOCK - NON-QUERY FUNCTIONS

| PARAMETER BLOCK VERSION NUMBER | MODEL VERSION NUMBER | CONTINUATION FLAG |
|---|---|---|
| FUNCTION-SPECIFIC-SAVE-AREA-ADDRESS ||| 
| OUTPUT TENSOR DESCRIPTOR 1 |||
| OUTPUT TENSOR DESCRIPTOR 2 |||
| INPUT TENSOR DESCRIPTOR 1 |||
| INPUT TENSOR DESCRIPTOR 2 |||
| INPUT TENSOR DESCRIPTOR 3 |||
| FUNCTION-SPECIFIC-PARAMETER 1 | FUNCTION-SPECIFIC-PARAMETER 2 ||
| FUNCTION-SPECIFIC-PARAMETER 3 | FUNCTION-SPECIFIC-PARAMETER 4 ||
| FUNCTION-SPECIFIC-PARAMETER 5 | ||
| CONTINUATION STATE BUFFER |||

TENSOR DESCRIPTOR    360, 365

| DATA LAYOUT FORMAT | DATA TYPE |
|---|---|
| DIMENSION-4 INDEX SIZE | DIMENSION-3 INDEX SIZE |
| DIMENSION-2 INDEX SIZE | DIMENSION-1 INDEX SIZE |
| TENSOR ADDRESS ||

NNP-DATA-TYPE-1

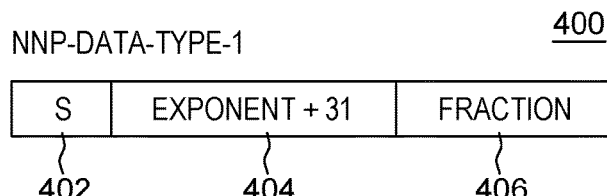

FIG. 4

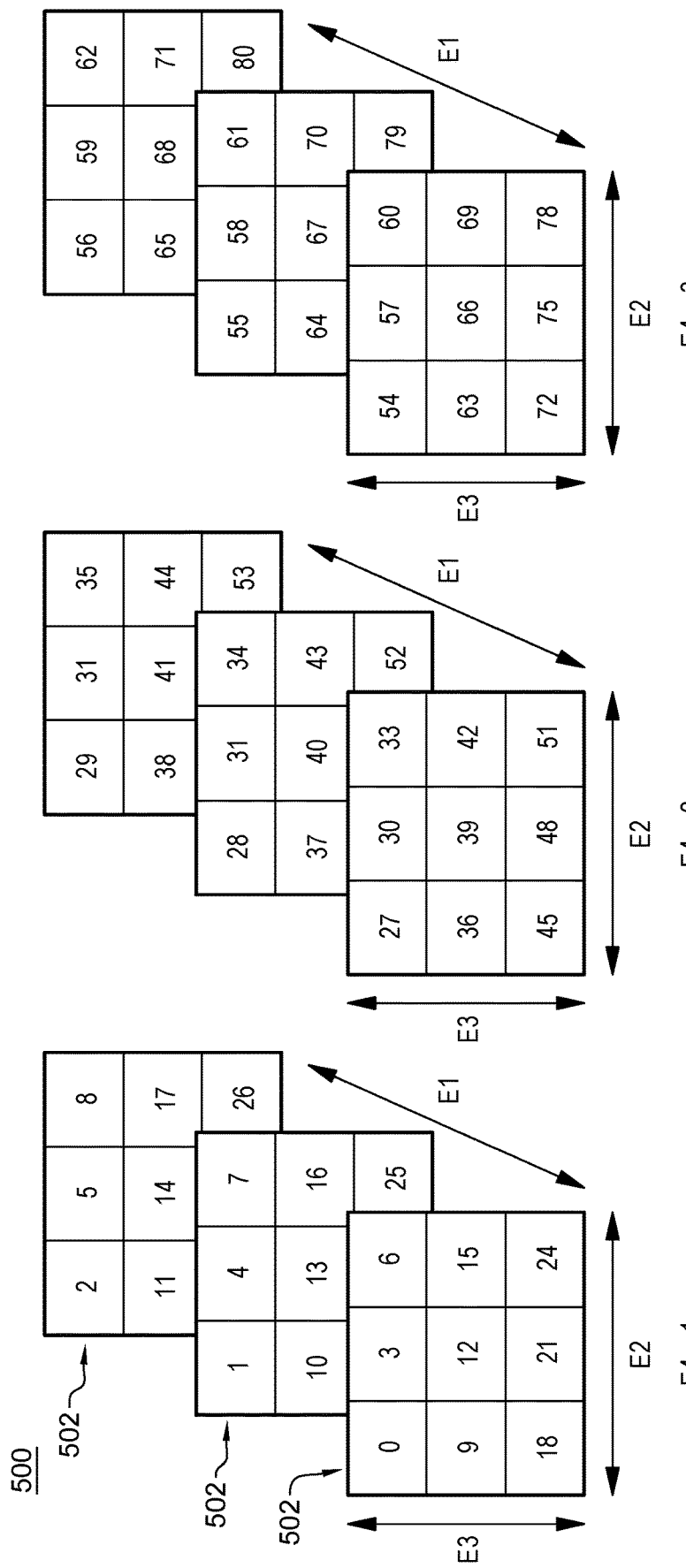

E4 = 1

PAGE 0
| e2_page_idx | e1_page_idx | | | 3 to 63 |
|---|---|---|---|---|
| | 0 | 1 | 2 | |
| 0 | 0 | 1 | 2 | PAD |
| 1 | 3 | 4 | 5 | PAD |
| 2 | 6 | 7 | 8 | PAD |
| 3-31 | PAD | PAD | PAD | PAD |

PAGE 1
| e2_page_idx | e1_page_idx | | | 3 to 63 |
|---|---|---|---|---|
| | 0 | 1 | 2 | |
| 0 | 9 | 10 | 11 | PAD |
| 1 | 12 | 13 | 14 | PAD |
| 2 | 15 | 16 | 17 | PAD |
| 3-31 | PAD | PAD | PAD | PAD |

PAGE 2
| e2_page_idx | e1_page_idx | | | 3 to 63 |
|---|---|---|---|---|
| | 0 | 1 | 2 | |
| 0 | 18 | 19 | 20 | PAD |
| 1 | 21 | 22 | 23 | PAD |
| 2 | 24 | 25 | 26 | PAD |
| 3-31 | PAD | PAD | PAD | PAD |

PAGE 3
| e2_page_idx | e1_page_idx | | | 3 to 63 |
|---|---|---|---|---|
| | 0 | 1 | 2 | |
| 0 | 27 | 28 | 29 | PAD |
| 1 | 30 | 31 | 32 | PAD |
| 2 | 33 | 34 | 35 | PAD |
| 3-31 | PAD | PAD | PAD | PAD |

PAGE 4
| e2_page_idx | e1_page_idx | | | 3 to 63 |
|---|---|---|---|---|
| | 0 | 1 | 2 | |
| 0 | 36 | 37 | 38 | PAD |
| 1 | 39 | 40 | 41 | PAD |
| 2 | 42 | 43 | 44 | PAD |
| 3-31 | PAD | PAD | PAD | PAD |

PAGE 5
| e2_page_idx | e1_page_idx | | | 3 to 63 |
|---|---|---|---|---|
| | 0 | 1 | 2 | |
| 0 | 45 | 46 | 47 | PAD |
| 1 | 48 | 49 | 50 | PAD |
| 2 | 51 | 52 | 53 | PAD |
| 3-31 | PAD | PAD | PAD | PAD |

PAGE 6
| e2_page_idx | e1_page_idx | | | 3 to 63 |
|---|---|---|---|---|
| | 0 | 1 | 2 | |
| 0 | 54 | 55 | 56 | PAD |
| 1 | 57 | 58 | 59 | PAD |
| 2 | 60 | 61 | 62 | PAD |
| 3-31 | PAD | PAD | PAD | PAD |

PAGE 7
| e2_page_idx | e1_page_idx | | | 3 to 63 |
|---|---|---|---|---|
| | 0 | 1 | 2 | |
| 0 | 63 | 64 | 65 | PAD |
| 1 | 66 | 67 | 68 | PAD |
| 2 | 69 | 70 | 71 | PAD |
| 3-31 | PAD | PAD | PAD | PAD |

PAGE 8
| e2_page_idx | e1_page_idx | | | 3 to 63 |
|---|---|---|---|---|
| | 0 | 1 | 2 | |
| 0 | 72 | 73 | 74 | PAD |
| 1 | 75 | 76 | 77 | PAD |
| 2 | 78 | 79 | 80 | PAD |
| 3-31 | PAD | PAD | PAD | PAD |

FIG. 6C

PERFORM INSTRUCTION PROCESSING FOR AN INSTRUCTION —700

THE INSTRUCTION CONFIGURED TO PERFORM A PLURALITY OF FUNCTIONS —702

A FUNCTION OF THE PLURALITY OF FUNCTIONS IS TO BE PERFORMED IN A PLURALITY OF PROCESSING PHASES —704

A PROCESSING PHASE OF THE PLURALITY OF PROCESSING PHASES IS DEFINED TO STORE UP TO A SELECT AMOUNT OF DATA —706

THE SELECT AMOUNT OF DATA BEING BASED ON THE FUNCTION OF THE PLURALITY OF FUNCTIONS TO BE PERFORMED —708

AT LEAST ONE FUNCTION OF THE PLURALITY OF FUNCTIONS HAS A DIFFERENT VALUE FOR THE SELECT AMOUNT OF DATA THAN AT LEAST ONE OTHER FUNCTION OF THE PLURALITY OF FUNCTIONS —710

DETERMINE WHETHER A STORE INTO A DESIGNATED AREA OCCURRED BASED ON PROCESSING A SELECT PROCESSING PHASE OF THE PLURALITY OF PROCESSING PHASES OF A SELECT FUNCTION —712

PRESENT AN INTERRUPT, BASED ON DETERMINING THAT THE STORE INTO THE DESIGNATED AREA OCCURRED —714

CONTINUE WITH PERFORMING INSTRUCTION PROCESSING, BASED ON DETERMINING THAT THE STORE INTO THE DESIGNATED AREA DID NOT OCCUR —716

THE CONTINUING WITH PERFORMING INSTRUCTION PROCESSING INCLUDES PROCEEDING TO PROCESSING OF A NEXT PROCESSING PHASE OF THE SELECT FUNCTION —720

THE CONTINUING WITH PERFORMING INSTRUCTION PROCESSING INCLUDES ENDING THE INSTRUCTION —722

THE DESIGNATED AREA INCLUDES AN AREA OF MEMORY DEFINED BY A STARTING ADDRESS AND AN ENDING ADDRESS —724

THE STARTING ADDRESS AND THE ENDING ADDRESS ARE PROVIDED BY ONE OR MORE CONTROL REGISTERS —726

FIG. 7A

THE DETERMINING WHETHER THE STORE INTO THE DESIGNATED AREA OCCURRED INCLUDES CHECKING WHETHER A MEMORY ADDRESS TO WHICH DATA IS BEING WRITTEN IS IN THE DESIGNATED AREA —730

BASED ON THE MEMORY ADDRESS BEING IN THE DESIGNATED AREA THE DETERMINING INDICATES THAT THERE IS A STORE INTO THE DESIGNATED AREA —732

THE DETERMINING WHETHER THE STORE INTO THE DESIGNATED AREA OCCURRED INCLUDES CHECKING WHETHER AT LEAST A PORTION OF A PARAMETER BLOCK TO BE USED BY THE SELECT FUNCTION OVERLAPS THE DESIGNATED AREA —734

BASED ON THE AT LEAST A PORTION OF THE PARAMETER BLOCK OVERLAPPING THE DESIGNATED AREA THE DETERMINING INDICATES THAT THERE IS A STORE INTO THE DESIGNATED AREA —736

THE DETERMINING WHETHER THE STORE INTO THE DESIGNATED AREA OCCURRED INCLUDES CHECKING WHETHER AT LEAST A PORTION OF A FUNCTION SPECIFIC SAVE AREA TO BE USED BY THE SELECT FUNCTION OVERLAPS THE DESIGNATED AREA —738

BASED ON THE AT LEAST A PORTION OF THE FUNCTION SPECIFIC SAVE AREA OVERLAPPING THE DESIGNATED AREA THE DETERMINING INDICATES THAT THERE IS A STORE INTO THE DESIGNATED AREA —740

PREDICTING THAT A PARTICULAR PROCESSING PHASE OF THE PLURALITY OF PROCESSING PHASES OF THE SELECT FUNCTION WILL CAUSE AN INTERRUPT —750

THE PREDICTING BEING BASED ON A MEMORY ACCESS PATTERN OF THE SELECT FUNCTION —752

PREDICTING THAT AN INTERRUPT WILL OCCUR BASED ON DETERMINING THAT AT LEAST A PORTION OF A PARAMETER BLOCK TO BE USED BY THE SELECT FUNCTION OVERLAPS THE DESIGNATED AREA —754

PREDICTING THAT AN INTERRUPT WILL OCCUR BASED ON DETERMINING THAT AT LEAST A PORTION OF A FUNCTION SPECIFIC SAVE AREA TO BE USED BY THE SELECT FUNCTION OVERLAPS THE DESIGNATED AREA —756

FIG. 7B

PROGRAM EVENT RECORDING STORAGE ALTERATION PROCESSING FOR A NEURAL NETWORK ACCELERATOR INSTRUCTION

BACKGROUND

One or more aspects relate, in general, to facilitating processing within a computing environment, and in particular, to improving such processing.

In order to enhance processing in computing environments that are data and/or computational-intensive, co-processors are utilized, such as artificial intelligence accelerators (also referred to as neural network processors or neural network accelerators). Such accelerators provide a great deal of compute power used in performing, for instance, involved computations, such as computations on matrices or tensors.

Tensor computations, as an example, are used in complex processing, including deep learning, which is a subset of machine learning. Deep learning or machine learning, an aspect of artificial intelligence, is used in various technologies, including but not limited to, engineering, manufacturing, medical technologies, automotive technologies, computer processing, etc.

During computational processing, if certain events occur, it is beneficial to obtain information relating to those events and/or the processing. Therefore, advancements are to be made in obtaining such information.

SUMMARY

Shortcomings of the prior art are overcome, and additional advantages are provided through the provision of a computer program product for facilitating processing within a computing environment. The computer program product includes one or more computer readable storage media and program instructions collectively stored on the one or more computer readable storage media to perform a method. The method includes performing instruction processing for an instruction. The instruction is configured to perform a plurality of functions, and a function of the plurality of functions is to be performed in a plurality of processing phases. A processing phase of the plurality of processing phases is defined to store up to a select amount of data. The select amount of data is based on the function of the plurality of functions to be performed. At least one function of the plurality of functions has a different value for the select amount of data than at least one other function of the plurality of functions. A determination is made as to whether a store into a designated area occurred based on processing a select processing phase of the plurality of processing phases of a select function. Based on determining that the store into the designated area occurred, an interrupt is presented, and based on determining that the store into the designated area did not occur, the performing instruction processing continues.

The use of a single architected machine instruction configured to perform various functions improves performance within the computing environment by reducing complexity, reducing use of resources and/or increasing processing speed.

By checking whether a store into the designated area occurred after a processing phase, a store into the designated area only occurs within a single phase prior to ending the instruction. Since a select amount of data is stored during each phase and the select amount may be greater than 4 K, a reduced number of checks may be needed for testing of whether there was a store into the designated area (e.g., if processing multiple contiguous 4 K pages).

In one example, the continuing with performing instruction processing includes proceeding to processing of a next processing phase of the select function. As another example, the continuing with performing instruction processing includes ending the instruction.

As an example, the designated area includes an area of memory defined by a starting address and an ending address. The starting address and the ending address are provided by, for instance, one or more control registers.

In one embodiment, the determining whether the store into the designated area occurred includes checking whether a memory address to which data is being written is in the designated area. Based on the memory address being in the designated area, the determining indicates that there is a store into the designated area.

In one embodiment, the determining whether the store into the designated area occurred includes checking whether at least a portion of a parameter block to be used by the select function overlaps the designated area. Based on the at least a portion of the parameter block overlapping the designated area, the determining indicates that there is a store into the designated area.

The checking for an overlap of the parameter block may cause an interrupt after each phase, readily providing information about the memory accesses.

In one embodiment, the determining whether the store into the designated area occurred includes checking whether at least a portion of a function specific save area to be used by the select function overlaps the designated area. Based on the at least a portion of the function specific save area overlapping the designated area, the determining indicates that there is a store into the designated area.

The checking for an overlap of the function specific save area, if to be used, may cause an interrupt after each phase, readily providing information about the memory accesses.

In one or more aspects, certain predictions may be made. For instance, it is predicted that a particular processing phase of the plurality of processing phases of a select function will cause an interrupt, in which the predicting is based on a memory access pattern of the select function. As a further example, it is predicted that an interrupt will occur based on determining that at least a portion of a parameter block to be used by the select function overlaps the designated area. In another example, it is predicted that an interrupt will occur based on determining that at least a portion of a function specific save area to be used by the select function overlaps the designated area.

Complexity is reduced for, at the very least, verification programs, which may predict a storage alteration interrupt, increasing verification quality. For instance, based on a memory access pattern corresponding to the function code, verification programs can predict exactly after which phase the instruction would interrupt and present the program event recording interrupt; and verification programming can predict the interrupt in case of a program event recording designated area being located within the parameter block and/or the function specific save area, as the interrupt would be presented after each phase.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 3C depicts examples of function codes supported by the Neural Network Processing Assist instruction, in accordance with one or more aspects of the present invention;

FIG. 3F depicts one example of a parameter block used by one or more non-query functions of the Neural Network Processing Assist instruction, in accordance with one or more aspects of the present invention;

FIG. 3G depicts one example of a tensor descriptor used by the Neural Network Processing Assist instruction, in accordance with one or more aspects of the present invention;

FIG. 4 depicts one example of a format of a Neural Network Processing (NNP)-data-type-1 data type, in accordance with one or more aspects of the present invention;

FIGS. 5A-5C depict examples of an input data layout used by the Neural Network Processing Assist instruction, in accordance with one or more aspects of the present invention;

FIGS. 6A-6C depict example output corresponding to the input data layout of FIGS. 5A-5C, in accordance with one or more aspects of the present invention;

FIGS. 7A-7B depict one example of facilitating processing within a computing environment, in accordance with one or more aspects of the present invention;

DETAILED DESCRIPTION

Figure 1A:
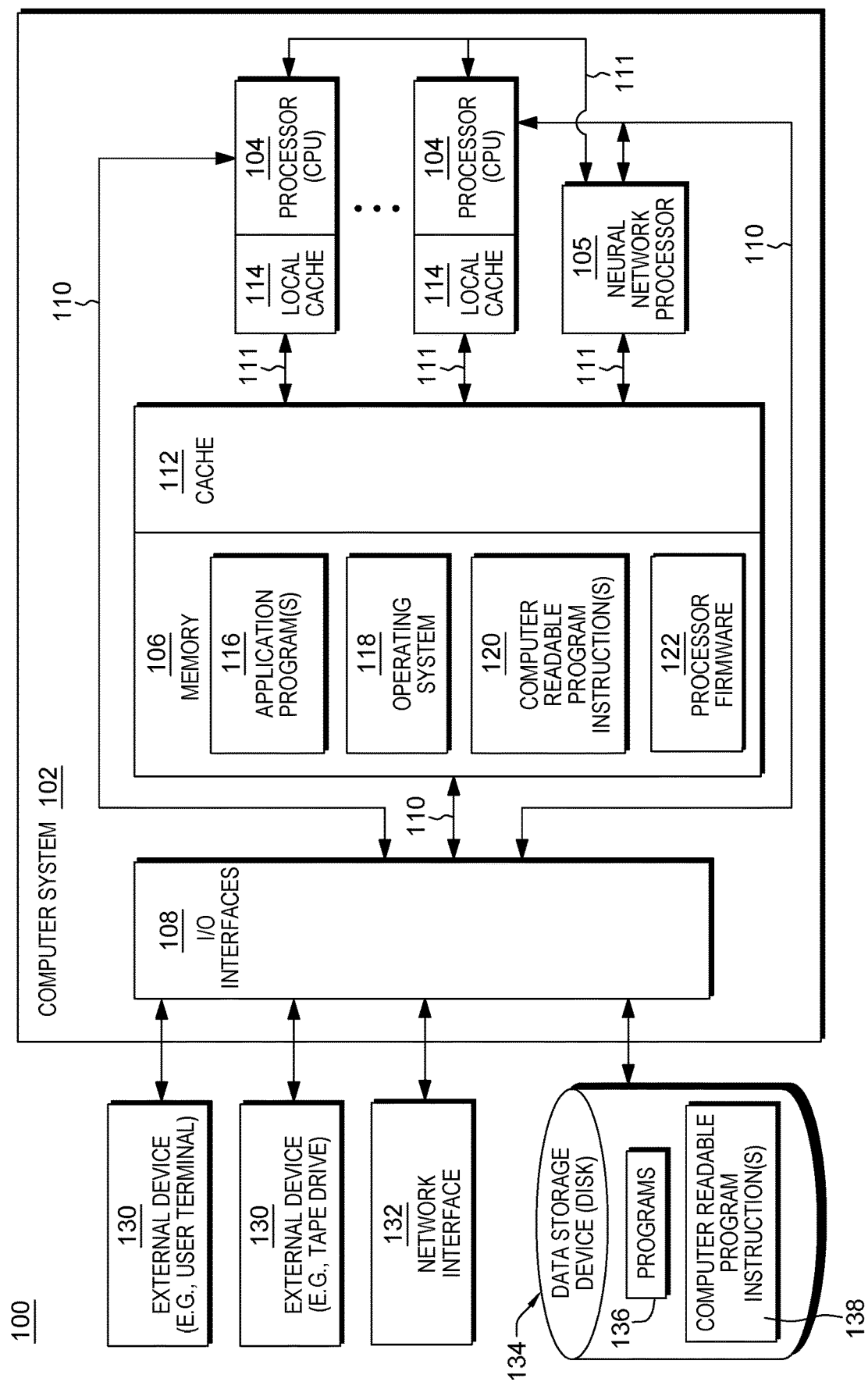
FIG. 1A depicts one example of a computing environment to incorporate and use one or more aspects of the present invention.

In accordance with one or more aspects of the present invention, a capability is provided to facilitate processing within a computing environment. As an example, a capability is provided to facilitate obtaining information relating to events that may occur during phases of instruction processing. This information is useful in determining whether a program executing within the computing environment is performing as expected and/or whether optimizations may be performed; in reducing errors and/or complexity; and/or in improving system performance. Further, in one example, the information reduces complexity for verification programs by enabling those programs to predict that an event (e.g., storage alteration causing an interrupt) will occur, increasing verification quality, reducing errors and/or improving system performance. The capability includes a program event recording facility used for, e.g., debugging programs that has been enhanced for certain types of processing, including, for instance, processing associated with instructions executed by special-purpose processors, such as neural network processors (a.k.a., neural network accelerators).

One example of an instruction for which program event recording has been enhanced is a Neural Network Processing Assist instruction, which is a single instruction (e.g., a single architected hardware machine instruction at the hardware/software interface) configured to perform multiple functions. Each of the functions is configured as part of the single instruction (e.g., the single architected instruction), reducing use of system resources and complexity, and improving system performance.

The instruction may be part of a general-purpose processor instruction set architecture (ISA), which is dispatched by a program on a processor, such as a general-purpose processor. It may be executed by the general-purpose processor and/or one or more functions of the instruction may be executed by a special-purpose processor, such as a co-processor configured for certain functions, that is coupled to or part of the general-purpose processor. Other variations are also possible.

One embodiment of a computing environment to incorporate and use one or more aspects of the present invention is described with reference to FIG. 1A. As an example, the computing environment is based on the z/Architecture® instruction set architecture, offered by International Business Machines Corporation, Armonk, N.Y. One embodiment of the z/Architecture instruction set architecture is described in a publication entitled, "z/Architecture Principles of Operation," IBM Publication No. SA22-7832-12, Thirteenth Edition, September 2019, which is hereby incorporated herein by reference in its entirety. The z/Architecture instruction set architecture, however, is only one example architecture; other architectures and/or other types of computing environments of International Business Machines Corporation and/or of other entities may include and/or use one or more aspects of the present invention. z/Architecture and IBM are trademarks or registered trademarks of International Business Machines Corporation in at least one jurisdiction.

Referring to FIG. 1A, a computing environment 100 includes, for instance, a computer system 102 shown, e.g., in the form of a general-purpose computing device. Computer system 102 may include, but is not limited to, one or more general-purpose processors or processing units 104 (e.g., central processing units (CPUs)), at least one special-purpose processor, such as a neural network processor 105, a memory 106 (a.k.a., system memory, main memory, main storage, central storage or storage, as examples), and one or more input/output (I/O) interfaces 108, coupled to one another via one or more buses and/or other connections. For instance, processors 104, 105 and memory 106 are coupled to I/O interfaces 108 via one or more buses 110, and processors 104, 105 are coupled to one another via one or more buses 111.

Bus 111 is, for instance, a memory or cache coherence bus, and bus 110 represents, e.g., one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

As examples, one or more special-purpose processors (e.g., neural network processors) may be separate from but coupled to one or more general-purpose processors and/or may be embedded within one or more general-purpose processors. Many variations are possible.

Memory 106 may include, for instance, a cache 112, such as a shared cache, which may be coupled to local caches 114 of processors 104 and/or to neural network processor 105, via, e.g., one or more buses 111. Further, memory 106 may include one or more programs or applications 116 and at least one operating system 118. An example operating system includes a z/OS® operating system, offered by International Business Machines Corporation, Armonk, N.Y. z/OS is a trademark or registered trademark of International Business Machines Corporation in at least one jurisdiction. Other operating systems offered by International Business Machines Corporation and/or other entities may also be used. Memory 106 may also include one or more computer readable program instructions 120, which may be configured to carry out functions of embodiments of aspects of the invention.

Moreover, in one or more embodiments, memory 106 includes processor firmware 122. Processor firmware includes, e.g., the microcode or millicode of a processor. It includes, for instance, the hardware-level instructions and/or data structures used in implementation of higher level machine code. In one embodiment, it includes, for instance, proprietary code that is typically delivered as microcode or millicode that includes trusted software, microcode or millicode specific to the underlying hardware and controls operating system access to the system hardware.

Computer system 102 may communicate via, e.g., I/O interfaces 108 with one or more external devices 130, such as a user terminal, a tape drive, a pointing device, a display, and one or more data storage devices 134, etc. A data storage device 134 may store one or more programs 136, one or more computer readable program instructions 138, and/or data, etc. The computer readable program instructions may be configured to carry out functions of embodiments of aspects of the invention.

Computer system 102 may also communicate via, e.g., I/O interfaces 108 with network interface 132, which enables computer system 102 to communicate with one or more networks, such as a local area network (LAN), a general wide area network (WAN), and/or a public network (e.g., the Internet), providing communication with other computing devices or systems.

Computer system 102 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 102. Examples, include, but are not limited to: microcode or millicode, device drivers, redundant processing units, external disk drive arrays, RAID systems, tape drives, and data archival storage systems, etc.

Computer system 102 may be operational with numerous other general-purpose or special-purpose computing system environments or configurations. Examples of well-known computing systems, environments, and/or configurations that may be suitable for use with computer system 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 1B:
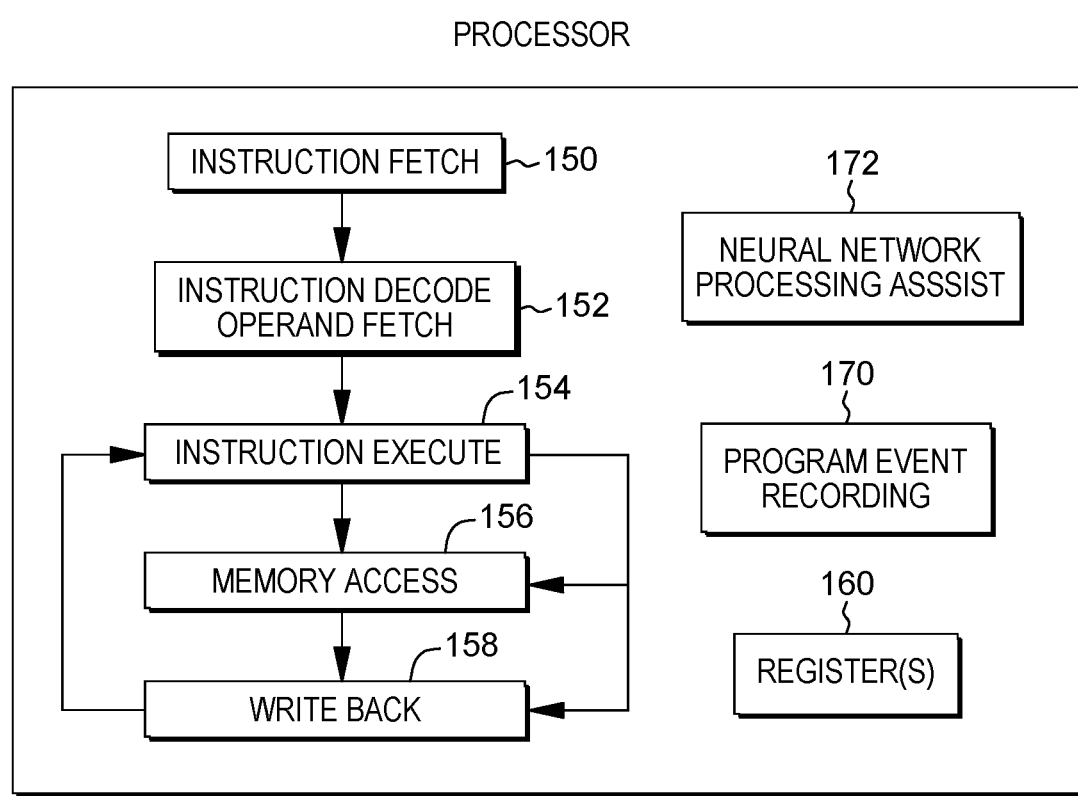
FIG. 1B depicts further details of a processor of FIG. 1A, in accordance with one or more aspects of the present invention.

In one example, a processor (e.g., processor 104 and/or processor 105) includes a plurality of functional components (or a subset thereof) used to execute instructions. As depicted in FIG. 1B, these functional components include, for instance, an instruction fetch component 150 to fetch instructions to be executed; an instruction decode unit 152 to decode the fetched instructions and to obtain operands of the decoded instructions; one or more instruction execute components 154 to execute the decoded instructions; a memory access component 156 to access memory for instruction execution, if necessary; and a write back component 158 to provide the results of the executed instructions. One or more of the components may access and/or use one or more registers 160 in instruction processing. Further, one or more of the components may, in accordance with one or more aspects of the present invention, include at least a portion of or have access to one or more other components used in performing program event recording processing and/or neural network processing assist processing of, e.g., a Neural Network Processing Assist instruction (or other processing that may use one or more aspects of the present invention), as described herein. The one or more other components may include, for instance, a program event recording component 170 and/or a neural network processing assist component 172 (and/or one or more other components).

In accordance with one or more aspects of the present invention, program event recording is enhanced such that an interruption due to a detected event may occur prior to instruction completion and after a select amount of data is written to a select location (e.g., memory), as defined by the particular function of the instruction being performed. As an example, detection of one or more select events (e.g., storage alteration of a designated area) may occur after processing of a processing phase of a plurality of processing phases of the function being performed. In a processing phase, up to a select amount of data may be stored to memory, and the select amount is based on the function of the instruction being performed. Different functions may have the same or different select amounts of data that may be stored in a particular phase. If the storing of the select amount of data includes a store into the designated area, a select event (e.g., storage alteration of a designated area) is detected and an interrupt is presented.

Figure 2A:
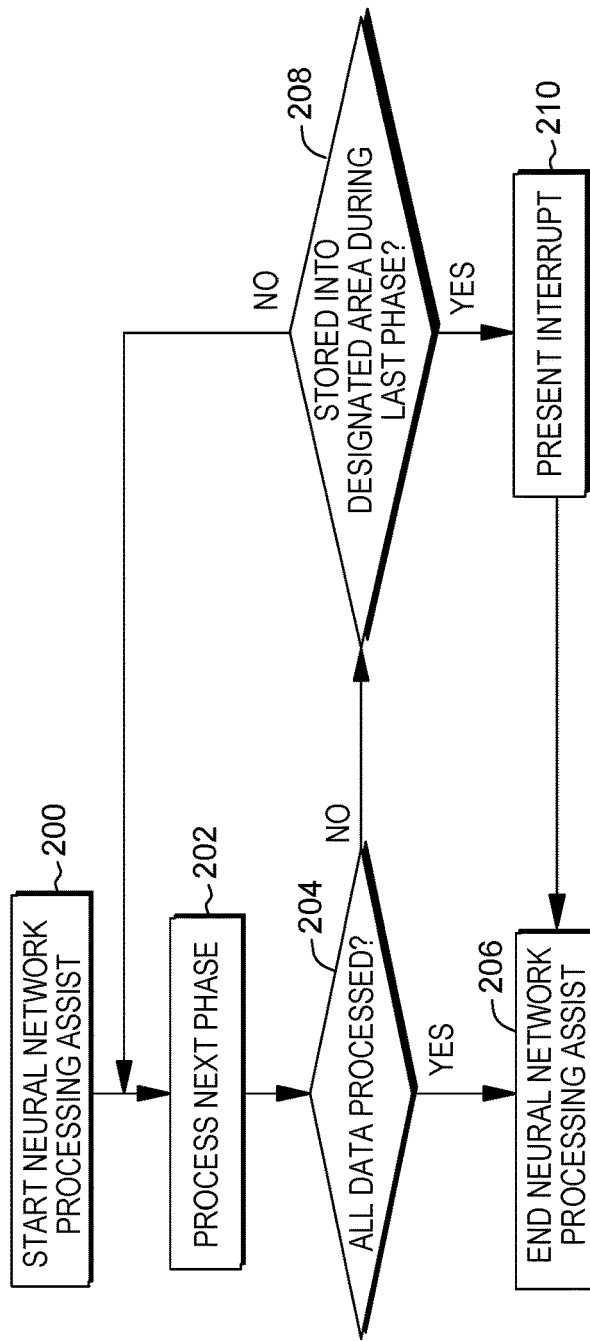
FIG. 2A depicts one example of processing relating to program event recording associated with a Neural Network Processing Assist instruction, in accordance with one or more aspects of the present invention.

Further details regarding program event recording processing with respect to a select instruction, such as a Neural Network Processing Assist instruction, are described with reference to FIGS. 2A-2B. Referring, initially to FIG. 2A, an instruction, such as a Neural Network Processing Assist instruction, is initiated by, e.g., a general-purpose processor, such as general-purpose processor 104 (200). The general-purpose processor performs instruction processing for the instruction including, for instance determining a function (e.g., a non-query function) of a plurality of functions configured for the instruction to be performed.

In accordance with an aspect of the present invention, the function is to be performed in processing phases, in which during each processing phase, up to a select amount of data may be stored to a select location (e.g., memory). The select amount of data to be processed within a phase is dependent on the function. Example functions and example maximum amounts of data that may be stored to, e.g., the target memory during a processing phase based on the function code of a Neural Network Processing Assist instruction are provided below (additional, fewer and/or other functions, function codes and/or maximum amounts, etc. may be provided in other embodiments):

NNPA-ADD (Function Code 16): 65536 target bytes per phase (16 contiguous 4K pages)
NNPA-SUB (Function Code 17): 65536 target bytes per phase (16 contiguous 4K pages)
NNPA-MUL (Function Code 18): 65536 target bytes per phase (16 contiguous 4K pages)
NNPA-DIV (Function Code 19): 65536 target bytes per phase (16 contiguous 4K pages)
NNPA-MIN (Function Code 20): 65536 target bytes per phase (16 contiguous 4K pages)
NNPA-MAX (Function Code 21): 65536 target bytes per phase (16 contiguous 4K pages)
NNPA-LOG (Function Code 32): 65536 target bytes per phase (16 contiguous 4K pages)
NNPA-EXP (Function Code 33): 65536 target bytes per phase (16 contiguous 4K pages)
NNPA-RELU (Function Code 49): 65536 target bytes per phase (16 contiguous 4K pages)
NNPA-TANH (Function Code 50): 65536 target bytes per phase (16 contiguous 4K pages)
NNPA-SIGMOID (Function Code 51): 65536 target bytes per phase (16 contiguous 4K pages)
NNPA-SOFTMAX (Function Code 52): 65536 target bytes per phase (16 non-contiguous 4K pages); Furthermore, 2 contiguous 4K pages called 'Function-specific-save-area'
NNPA-BATCHNORM (Function Code 64): 65536 target bytes per phase (16 non-contiguous 4K pages)
NNPA-MAXPOOL2D (Function Code 80): 131072 target bytes per phase (32 non-contiguous 4K pages)
NNPA-AVGPOOL2D (Function Code 81): 131072 target bytes per phase (32 non-contiguous 4K pages)
NNPA-LSTM (Function Code 96): 16384 target bytes per phase (4 non-contiguous 4K pages)
NNPA-GRU (Function Code 97): 8192 target bytes per phase (2 non-contiguous 4K pages)
NNPA-CONVOLUTION (Function Code 112): 131072 target bytes per phase (32 non-contiguous 4K pages)
NNPA-MATMUL-OP (Function Code 113): 131072 target bytes per phase (32 non-contiguous 4K pages)
NNPA-MATMUL-OP-BCAST23 (Function Code 114): 131072 target bytes per phase (32 non-contiguous 4K pages)

As indicated, a function of an instruction (e.g., the Neural Network Processing Assist instruction) is performed in processing phases. Therefore, based on starting the instruction, processing of a processing phase of the function commences 202. In one embodiment, the function selected to be performed (referred to herein as a select function) is performed by a special-purpose processor (e.g., neural network processor 105), and therefore, as part of an initial processing phase, the general-purpose processor provides an indication to the special-purpose processor of the select function to be performed. Further, in one example, processing of the processing phase includes sending by the general-purpose processor (e.g., firmware 122 of general-purpose processor 104) to the special-purpose processor memory addresses for use in performing the select function during the processing phase. The firmware also provides, in one example, an indication to the special-purpose processor of an end of the processing phase. In one example, as part of sending the memory addresses to the special-purpose processor, the general-purpose processor (e.g., firmware 122) performs one or more memory related checks, including those related to program event recording. For instance, the firmware determines, prior to providing the addresses for the given processing phase, whether the memory addresses being presented for the processing phase would fall into a program event recording designated area. If one or more addresses would fall within the designated area, then the firmware indicates to the special-purpose processor that processing is to stop after processing this phase.

The special-purpose processor (e.g., neural network processor 105) receives the addresses, as well as the information regarding the end of the phase and whether there is, e.g., a program event recording event, and performs the select function on input data (e.g., input tensor data) to provide output data (e.g., output tensor data). When a processing phase completes, the special-purpose processor passes to the firmware a counter that was increased at the end of the current phase and stops processing until it receives additional memory addresses for a next phase.

The general-purpose processor (e.g., firmware 122) receives an indication that processing of the last phase is complete and makes a determination as to whether all the data has been processed 204. If all of the data has been processed, then the instruction completes 206. However, if all the data has not been processed, then a check is made (e.g., by the firmware) as to whether there was a store into a designated area during the writing to memory in the last phase 208. As an example, for program event recording, a designated area is defined via, e.g., control registers, such as control register 10, which provides the starting address of the designated area and control register 11, which provides the ending address of the designated area. In other examples, other control registers may be used and/or other mechanisms may be used to provide the starting and ending addresses. If data is written to one or more memory addresses that overlap with the designated area, then it is determined that there is a store into the designated area and a program event recording storage alteration event is detected, assuming program event recording storage alteration is enabled. In one example, program event recording storage alteration is enabled when a storage alteration event control (e.g., a select bit (e.g., bit 34) of a select control register (e.g., control register 9)) is set (e.g., to one) and either a storage alteration space control (e.g., a select bit (e.g., bit 42) of a select control register (e.g., control register 9)) is set (e.g., to zero) or a select bit (e.g., bit 56) of an address space control element is set, e.g., to one.

Further, in one example, if at least a portion of a parameter block used by the function and/or at least a portion of a function specific save area, if to be used by the function, overlaps the designated area, then, in one embodiment, it is determined that there is a store to the designated area (e.g., a storage alteration event) regardless of whether such a store occurred. In another example, it is determined that a store to the designated area occurred only if there is a store into the portion that overlaps the designated area. In yet a further example, it is determined that a store to the designated area occurred if the entire function save area, if to be to be used by the function, or if the entire parameter block overlaps the designated area, regardless of whether the parameter block or function specific save area was updated. Other variations are possible.

If it is determined that there was not a store to the designated area, then processing continues to the next processing phase 202 in which the general-purpose processor provides additional memory addresses to the special-purpose processor for further processing of the function in the next phase. However, if it is determined that a store to the designated area occurred during the last phase, then an interrupt is presented 210 by, e.g., the firmware, and the instruction ends 206. This interrupt is presented without waiting until all the data is processed. Further, in accordance with an aspect of the present invention, an amount of data greater than 4K may have been stored during the processing phase and prior to the interruption. For instance, the amount of resulting output data created during a processing phase depends on the function code, in which different function codes may have different amounts of data. Additionally, data may be stored into several 4K pages which may or may not be contiguous within the logical address space during a processing phase; a parameter block may be updated during performance of the function and the parameter block may be updated multiple times; and a function specific save area may be updated based on the function being performed and the function specific save area may be updated multiple times. Other possibilities exist.

In one embodiment, when the instruction ends, a determination may also be made as to whether processing of the last phase caused a store into the designated area. This information may be used for, e.g., debugging purposes.

Figure 2B:
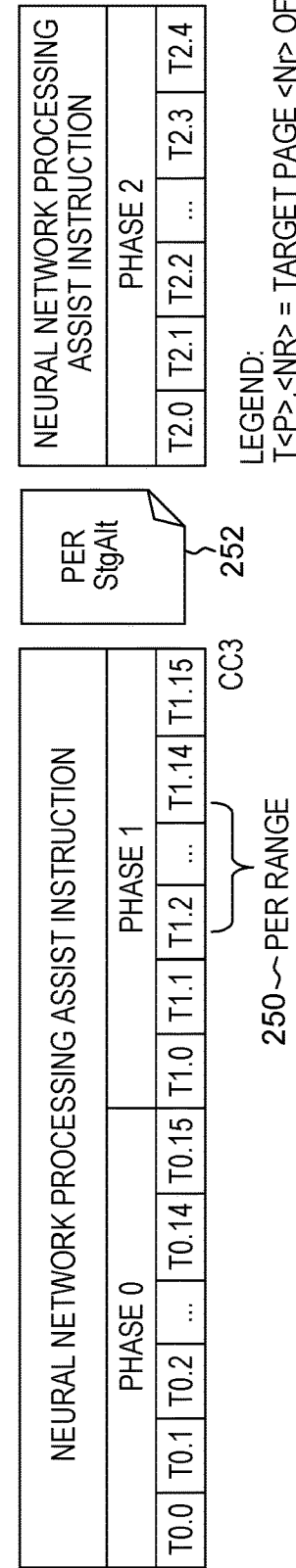
FIG. 2B depicts one example of a storage alteration event occurring during a processing phase of a function of a Neural Network Processing Assist instruction, in accordance with one or more aspects of the present invention.

One example of a depiction of a program event recording storage alteration event is shown in FIG. 2B. As depicted, in one example, phase 0 of a select function of a Neural Network Processing Assist instruction is processed without a store into the designated area; however, during processing of phase 1, a write into the designated area is performed 250. Therefore, at the end of the phase, a program event recording storage alteration event occurs 252, causing an interrupt of the instruction (e.g., instruction ends with a condition code of, e.g., 3). Phase 2 would not be performed unless and until a re-start of the instruction.

As described herein, in one example, the instruction being processed is a Neural Network Processing Assist instruction. In one example, the instruction is initiated on a general-purpose processor (e.g., processor 104) and a function specified by the instruction is either executed on the general-purpose processor and/or a special-purpose processor (e.g., neural network processor 105) depending on the function. For instance, in one example, a query function of the Neural Network Processing Assist instruction is performed on the general-purpose processor and non-query functions are performed on the special-purpose processor. However, other variations are possible. If the function is to be performed on the special-purpose processor (e.g., it is a non-query function, or in another example, one or more selected functions), then information is provided, e.g., by the general-purpose processor to the special-purpose processor for use in executing the function, such as memory address information relating to tensor data to be used in neural network computations. The special-purpose processor obtains the information and performs the function. After execution of the function is complete, processing returns to the general-purpose processor, which completes the instruction. In other examples, the instruction is initiated, executed and completed on one or more general-purpose processors or one or more special-purpose processors. Other variations are possible.

Figure 3A:
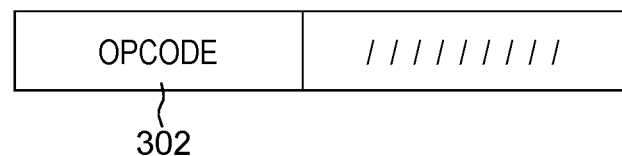
FIG. 3A depicts one example of a format of a Neural Network Processing Assist instruction, in accordance with one or more aspects of the present invention.

In one example, referring to FIG. 3A, a Neural Network Processing Assist instruction 300 has an RRE format that denotes a register and register operation with an extended operation code (opcode). As shown in FIG. 3A, in one example, Neural Network Processing Assist instruction 300 includes an operation code (opcode) field 302 (e.g., bits 0-15) indicating a neural network processing assist operation. In one example, bits 16-31 of the instruction are reserved and are to contain zeros. In the description herein of the instruction and/or functions of the instructions, specific locations, specific fields and/or specific sizes of the fields are indicated (e.g., specific bytes and/or bits). However, other locations, fields and/or sizes may be provided. Further, although the setting of a bit to a particular value, e.g., one or zero, may be specified, this is only an example. The bit, if set, may be set to a different value, such as the opposite value or to another value, in other examples. Many variations are possible.

In one example, the instruction uses a plurality of general registers implicitly specified by the instruction. For instance, Neural Network Processing Assist instruction 300 uses implied registers general register 0 and general register 1, examples of which are described with reference to FIGS. 3B and 3D, respectively.

Figure 3B:
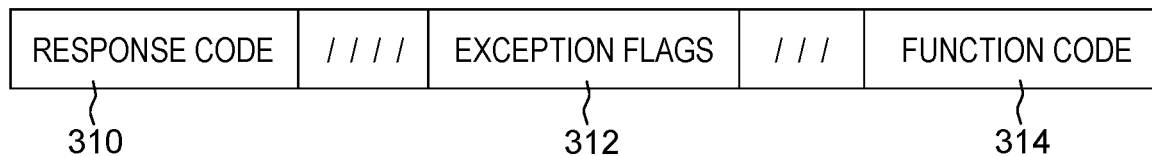
FIG. 3B depicts one example of a general register used by the Neural Network Processing Assist instruction, in accordance with one or more aspects of the present invention.

Referring to FIG. 3B, in one example, general register 0 includes a function code field, and status fields which may be updated upon completion of the instruction. As an example, general register 0 includes a response code field 310 (e.g., bits 0-15), an exception flags field 312 (e.g., bits 24-31) and a function code field 314 (e.g., bits 56-63). Further, in one example, bits 16-23 and 32-55 of general register 0 are reserved and are to contain zeros. One or more fields are used by a particular function performed by the instruction. Not all fields are used by all of the functions, in one example. Each of the fields is described below:

Response Code (RC) 310: This field (e.g., bit positions 0-15) contains the response code. When execution of the Neural Network Processing Assist instruction completes with a condition code of, e.g., one, a response code is stored. When an invalid input condition is encountered, a non-zero value is stored to the response code field, which indicates the cause of the invalid input condition recognized during execution and a selected condition code, e.g., 1, is set. The codes stored to the response code field are defined, as follows, in one example:

| Response Code | Meaning |
| --- | --- |
| 0001 | The format of the parameter block, as specified by the parameter block version number, is not supported by the model. |
| 0002 | The specified function is not defined or installed on the machine. |
| 0010 | A specified tensor data layout format is not supported. |
| 0011 | A specified tensor data type is not supported. |
| 0012 | A specified single tensor dimension is greater than the maximum dimension index size. |
| 0013 | The size of a specified tensor is greater than the maximum tensor size. |
| 0014 | The specified tensor address is not aligned on a 4K-byte boundary. |
| 0015 | The function-specific-save-area-address is not aligned on a 4K-byte boundary. |
| F000-FFFF | Function specific response codes. These response codes are defined for certain functions. |

Exception Flags (EF) 312: This field (e.g., bit positions 24-31) includes the exception flags. If an exception condition is detected during execution of the instruction, the corresponding exception flag control (e.g., bit) will be set to, e.g., one; otherwise, the control remains unchanged. The exception flags field is to be initialized to zero prior to the first invocation of the instruction. Reserved flags are unchanged during the execution of the instruction. The flags stored to the exception flags field are defined as follows, in one example:

| EF (Bit) | Meaning |
| --- | --- |
| 0 | Range Violation. This flag is set when a non-numeric value was either detected in an input tensor or stored to the output tensor. This flag is, e.g., only valid when the instruction completes with condition code, e.g., 0. |
| 1-7 | Reserved. |

Function Code (FC) 314: This field (e.g., bit positions 56-63) includes the function code. Examples of assigned function codes for the Neural Network Processing Assist instruction are depicted in FIG. 3C. All other function codes are unassigned. If an unassigned or uninstalled function code is specified, a response code of, e.g., 0002 hex and a select condition code, e.g., 1, are set. This field is not modified during execution.

Figure 3D:
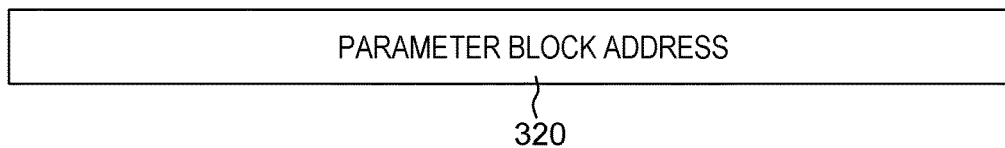
FIG. 3D depicts one example of another general register used by the Neural Network Processing Assist instruction, in accordance with one or more aspects of the present invention.

As indicated, in addition to general register 0, the Neural Network Processing Assist instruction also uses general register 1, an example of which is depicted in FIG. 3D. As examples, bits 40-63 in the 24-bit addressing mode, bits 33-63 in the 31-bit addressing mode or bits 0-63 in the 64-bit addressing mode include an address of a parameter block 320. The contents of general register 1 specify, for instance, a logical address of a leftmost byte of the parameter block in storage. The parameter block is to be designated on a doubleword boundary; otherwise, a specification exception is recognized. For all functions, the contents of general register 1 are not modified.

In the access register mode, access register 1 specifies an address space containing the parameter block, input tensors, output tensors and the function specific save area, as an example.

In one example, the parameter block may have different formats depending on the function specified by the instruction to be performed. For instance, the query function has a parameter block of one format and other functions of the instruction have a parameter block of another format. In another example, all functions use the same parameter block format. Other variations are also possible.

Figure 3E:
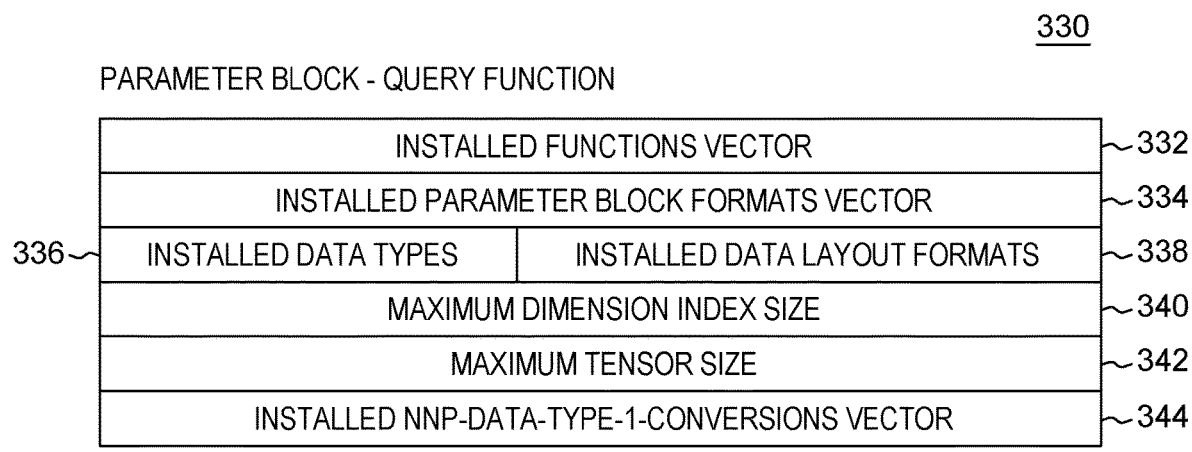
FIG. 3E depicts one example of a parameter block used by a query function of the Neural Network Processing Assist instruction, in accordance with one or more aspects of the present invention.

One example of a parameter block used by a query function, such as the NNPA-Query Available Functions (QAF) operation, is described with reference to FIG. 3E. As shown, in one example, a NNPA-Query Available Functions parameter block 330 includes, for instance:

Installed Functions Vector 332: This field (e.g., bytes 0-31) of the parameter block includes the installed functions vector. In one example, bits 0-255 of the installed functions vector correspond to function codes 0-255, respectively, of the Neural Network Processing Assist instruction. When a bit is, e.g., one, the corresponding function is installed; otherwise, the function is not installed.

Installed Parameter Block Formats Vector 334: This field (e.g., bytes 32-47) of the parameter block includes the installed parameter block formats vector. In one example, bits 0-127 of the installed parameter block formats vector correspond to parameter block formats 0-127 for the non-query functions of the Neural Network Processing Assist instruction. When a bit is, e.g., one, the corresponding parameter block format is installed; otherwise, the parameter block format is not installed.

Installed Data Types 336: This field (e.g., bytes 48-49) of the parameter block includes the installed data types vector. In one example, bits 0-15 of the installed data types vector correspond to the data types being installed. When a bit is, e.g., one, the corresponding data type is installed; otherwise, the data type is not installed. Example data types include (additional, fewer and/or other data types are possible):

| Bit | Data Type |
| --- | --- |
| 0 | NNP-data-type-1 |
| 1-15 | Reserved |

Installed Data Layout Formats 338: This field (e.g., bytes 52-55) of the parameter block includes the installed data layout formats vector. In one example, bits 0-31 of the installed data layout formats vector correspond to data layout formats being installed. When a bit is, e.g., one, the corresponding data layout format is installed; otherwise, the data layout format is not installed. Example data layout formats include (additional, fewer and/or other data layout formats are possible):

| Bit | Data Layout Format |
| --- | --- |
| 0 | 4D-feature tensor |
| 1 | 4D-kernel tensor |
| 2-31 | Reserved |

Maximum Dimension Index Size 340: This field (e.g., bytes 60-63) of the parameter block includes, e.g., a 32-bit unsigned binary integer that specifies a maximum number of elements in a specified dimension index size for any specified tensor. In another example, the maximum dimension index size specifies a maximum number of bytes in a specified dimension index size for any specified tensor. Other examples are also possible.

Maximum Tensor Size 342: This field (e.g., bytes 64-71) of the parameter block includes, e.g., a 32-bit unsigned binary integer that specifies a maximum number of bytes in any specified tensor including any pad bytes required by the tensor format. In another example, the maximum tensor size specifies a maximum number of total elements in any specified tensor including any padding required by the tensor format. Other examples are also possible.

Installed-NNP-Data-Type-1-Conversions Vector 344: This field (e.g., bytes 72-73) of the parameter block includes the installed-NNP-Data-Type-1-conversions vector. In one example, bits 0-15 of the installed-NNP-Data-Type-1-conversions vector correspond to installed data type conversion from/to NNP-data-type-1 format. When a bit is one, the corresponding conversion is installed; otherwise, the conversion is not installed. Additional, fewer and/or other conversions may be specified.

| Bit | Data Type |
|---|---|
| 0 | Reserved |
| 1 | BFP tiny format |
| 2 | BFP short format |
| 3-15 | Reserved |

Although one example of a parameter block for a query function is described with reference to FIG. 3E, other formats of a parameter block for a query function, including the NNPA-Query Available Functions operation, may be used. The format may depend, in one example, on the type of query function to be performed. Further, the parameter block and/or each field of the parameter block may include additional, fewer and/or other information.

In addition to the parameter block for a query function, in one example, there is a parameter block format for non-query functions, such as non-query functions of the Neural-Network Processing Assist instruction. One example of a parameter block used by a non-query function, such as a non-query function of the Neural Network Processing Assist instruction, is described with reference to FIG. 3F.

As shown, in one example, a parameter block 350 employed by, e.g., the non-query functions of the Neural Network Processing Assist instruction includes, for instance:

Parameter Block Version Number 352: This field (e.g., bytes 0-1) of the parameter block specifies the version and size of the parameter block. In one example, bits 0-8 of the parameter block version number are reserved and are to contain zeros, and bits 9-15 of the parameter block version number contain an unsigned binary integer specifying the format of the parameter block. The query function provides a mechanism of indicating the parameter block formats available. When the size or format of the parameter block specified is not supported by the model, a response code of, e.g., 0001 hex is stored in general register 0 and the instruction completes by setting a condition code, e.g., condition code 1. The parameter block version number is specified by the program and is not modified during the execution of the instruction.

Model Version Number 354: This field (e.g., byte 2) of the parameter block is an unsigned binary integer identifying the model which executed the instruction (e.g., the particular non-query function). When a continuation flag (described below) is one, the model version number may be an input to the operation for the purpose of interpreting the contents of a continuation state buffer field (described below) of the parameter block to resume the operation.

Continuation Flag 356: This field (e.g., bit 63) of the parameter block, when, e.g., one, indicates the operation is partially complete and the contents of the continuation state buffer may be used to resume the operation. The program is to initialize the continuation flag to zero and not modify the continuation flag in the event the instruction is to be re-executed for the purpose of resuming the operation; otherwise, results are unpredictable.

If the continuation flag is set at the beginning of the operation and the contents of the parameter block have changed since the initial invocation, results are unpredictable.

Function-specific-save-area-address 358: This field (e.g., bytes 56-63) of the parameter block includes the logical address of the function specific save area. In one example, the function-specific-save-area-address is to be aligned on a 4 K-byte boundary; otherwise, a response code of, e.g., 0015 hex is set in general register 0 and the instruction completes with a condition code of, e.g., 1. The address is subject to the current addressing mode. The size of the function specific save area depends on the function code.

When the entire function specific save area overlaps the program event recording (PER) storage area designation, a PER storage alteration event is recognized, when applicable, for the function specific save area. When only a portion of the function specific save area overlaps the PER storage area designation, it is model-dependent which of the following occurs:

A PER storage alteration event is recognized, when applicable, for the entire function specific save area.

A PER storage alteration event is recognized, when applicable, for the portion of the function specific save area that is stored.

When the entire parameter block overlaps the PER storage area designation, a PER storage alteration event is recognized, when applicable, for the parameter block. When only a portion of the parameter block overlaps the PER storage area designation, it is model-dependent which of the following occurs:

A PER storage alteration event is recognized, when applicable, for the entire parameter block.

A PER storage alteration event is recognized, when applicable, for the portion of the parameter block that is stored.

A PER zero-address detection event is recognized, when applicable, for the parameter block. Zero address detection does not apply to the tensor addresses or the function-specific-save-area-address, in one example.

Output Tensor Descriptors (e.g., 1-2) 360/Input Tensor Descriptors (e.g., 1-3) 365: One example of a tensor descriptor is described with reference to FIG. 3G. In one example, a tensor descriptor 360, 365 includes:

Data Layout Format 382: This field (e.g., byte 0) of the tensor descriptor specifies the data layout format. Valid data layout formats include, for instance (additional, fewer and/or other data layout formats are possible):

| Format | Description | Alignment (bytes) |
| --- | --- | --- |
| 0 | 4D-feature tensor | 4096 |
| 1 | 4D-kernel tensor | 4096 |
| 2-255 | Reserved | — |

If an unsupported or reserved data layout format is specified, the response code of, e.g., 0010 hex, is stored in general register 0 and the instruction completes by setting condition code, e.g., 1.

Data Type 384: This field (e.g., byte 1) specifies the data type of the tensor. Examples of supported data types are described below (additional, fewer and/or other data types are possible):

| Value | Data Type | Data Size (bits) |
| --- | --- | --- |
| 0 | NNP data-type-1 | 16 |
| 1-255 | Reserved | — |

If an unsupported or reserved data type is specified, a response code of, e.g., 0011 hex is stored in general register 0 and the instruction completes by setting condition code, e.g., 1.

Dimension 1-4 Index Size 386: Collectively, dimension index sizes one through four specify the shape of a 4D tensor. Each dimension index size is to be greater than zero and less than or equal to the maximum dimension index size (340, FIG. 3E); otherwise, a response code of, e.g., 0012 hex is stored in general register 0 and the instruction completes by setting condition code, e.g., 1. The total tensor size is to be less than or equal to the maximum tensor size (342, FIG. 3E); otherwise, a response code, e.g., 0013 hex is stored in general register 0 and the instruction completes by setting condition code, e.g., 1.

In one example, to determine the number of bytes in a 4D-feature tensor with elements of NNPA-data-type-1 (i.e., total tensor size), the following is used: dimension-index-4*dimension-index-3* ceil (dimension-index-2/32)*32* ceil (dimension-index-1/64)*64 * 2.

Tensor Address 388: This field (e.g., bytes 24-31) of the tensor descriptor includes a logical address of the leftmost byte of the tensor. The address is subject to the current addressing mode.

If the address is not aligned on the boundary of the associated data layout format, a response code of, e.g., 0014 hex, is stored in general register 0 and the instruction completes by setting condition code, e.g., 1.

In the access register mode, access register 1 specifies the address space containing all active input and output tensors in storage.

Returning to FIG. 3F, parameter block 350 further includes, in one example, function-specific-parameters 1-5 (370), which may be used by specific functions, as described herein.

Further, parameter block 350 includes, in one example, a continuation state buffer field 375, which includes data (or a location of data) to be used if operation of this instruction is to be resumed.

As an input to the operation, reserved fields of the parameter block should contain zeros. When the operation ends, reserved fields may be stored as zeros or remain unchanged.

Although one example of a parameter block for a non-query function is described with reference to FIG. 3F, other formats of a parameter block for a non-query function, including a non-query function of the Neural Network Processing Assist instruction, may be used. The format may depend, in one example, on the type of function to be performed. Further, although one example of a tensor descriptor is described with reference to FIG. 3G, other formats may be used. Further, different formats for input and output tensors may be used. Other variations are possible.

Further details regarding various functions supported by one embodiment of the Neural Network Processing Assist instruction are described below:

Function Code 0: NNPA-QAF (Query Available Functions)

The Neural Network Processing Assist (NNPA) query function provides a mechanism to indicate selected information, such as, for instance, the availability of installed functions, installed parameter block formats, installed data types, installed data layout formats, maximum dimension index size and maximum tensor size. The information is obtained and placed in a selected location, such as a parameter block (e.g., parameter block 330). When the operation ends, reserved fields of the parameter block may be stored as zeros or may remain unchanged.

In execution of one embodiment of the query function, a processor, such as general-purpose processor 104, obtains information relating to a specific model of a selected processor, such as a specific model of a neural network processor, such as neural network processor 105. A specific model of a processor or machine has certain capabilities. Another model of the processor or machine may have additional, fewer and/or different capabilities and/or be of a different generation (e.g., a current or future generation) having additional, fewer and/or different capabilities. The obtained information is placed in a parameter block (e.g., parameter block 330) or other structure that is accessible to and/or for use with one or more applications that may use this information in further processing. In one example, the parameter block and/or information of the parameter block is maintained in memory. In other embodiments, the parameter block and/or information may be maintained in one or more hardware registers. As another example, the query function may be a privileged operation executed by the operating system, which makes available an application programming interface to make this information available to the application or non-privileged program. In yet a further example, the query function is performed by a special-purpose processor, such as neural network processor 105. Other variations are possible.

The information is obtained, e.g., by the firmware of the processor executing the query function. The firmware has knowledge of the attributes of the specific model of the specific processor (e.g., neural network processor). This information may be stored in, e.g., a control block, register and/or memory and/or otherwise be accessible to the processor executing the query function.

The obtained information includes, for instance, model-dependent detailed information regarding at least one or more data attributes of the specific processor, including, for instance, one or more installed or supported data types, one or more installed or supported data layout formats and/or one or more installed or supported data sizes of the selected model of the specific processor. When execution of the query function (e.g., NNPA-QAF function) completes, condition code 0, as an example, is set. Condition codes 1, 2 and 3 are not applicable to the query function, in one example. Further information relating to the obtained information is described below.

As indicated, in one example, the obtained information includes model-dependent information about one or more data attributes of, e.g., a particular model of a neural network processor. One example of a data attribute is installed data types of the neural network processor. For instance, a particular model of a neural network processor (or other processor) may support one or more data types, such as a NNP-data-type-1 data type (also referred to as a neural network processing-data-type-1 data type) and/or other data types, as examples. The NNP-data-type-1 data type is a 16-bit floating-point format that provides a number of advantages for deep learning training and inference computations, including, for instance: preserves the accuracy of deep learning networks; eliminates the subnormal format which simplifies rounding modes and handling of corner cases; automatic rounding to the nearest value for arithmetic operations; and special entities of infinity and not-a-number (NaN) are combined into one value (NINF), which is accepted and handled by arithmetic operations. NINF provides better defaults for exponent overflow and invalid operations (such as division by zero). This allows many programs to continue running without hiding such errors and without using specialized exception handlers. Other model-dependent data types are also possible.

One example of a format of the NNP-data-type-1 data type is depicted in FIG. 4. As depicted, in one example, NNP-data-type-1 data may be represented in a format 400, which includes, for instance, a sign 402 (e.g., bit 0), an exponent +31 404 (e.g., bits 1-6) and a fraction 406 (e.g., bits 7-15).

Example properties of the NNP-data-type-1 format are depicted below:

| Property | NNP-data-type-1 |
| --- | --- |
| Format length (bits) | 16 bits |
| Biased-exponent length (bits) | 6 bits |
| Fraction length (bits) | 9 bits |
| Precision (p) | 10 bits |
| Maximum left-units-view exponent (Emax) | 32 |
| Minimum left-units-view exponent (Emin) | −31 |
| Left-units-view (LLFV) bias | 31 |
| Nmax | $(1 - 2^{-9}) \times 2^{33} \approx 8.6 \times 10^9$ |
| Nmin | $(1 + 2^{-9}) \times 2^{-31} \approx 4.6 \times 10^{-10}$ |
| Dmin | — |

Where ≈ indicates that the value is approximate, Nmax is largest (in magnitude) representable finite number, and Nmin is smallest (in magnitude) representable number.

Further details relating to the NNP-data-type-1 data type are described below:

Biased Exponent: The bias that is used to allow exponents to be expressed as unsigned numbers is shown above. Biased exponents are similar to characteristics of the binary floating-point format, except that no special meanings are attached to biased exponents of all zeros and all ones, as described below with reference to the classes of the NNP-data-type-1 data type.

Significand: The binary point of a NNP-data-type-1 number is considered to be to the left of the leftmost fraction bit. To the left of the binary point there is an implied unit bit, which is considered to be one for normal numbers and zero for zeros. The fraction with the implied unit bit appended on the left is the significand of the number.

The value of a normal NNP-data-type-1 is the significand multiplied by the radix 2 raised to the power of the unbiased exponent.

Values of Non-Zero Numbers: The values of non-zero numbers are shown below:

| Number Class | Value |
| --- | --- |
| Normal numbers | $\pm 2^{e-31} \times (1.f)$ |

Where e is biased exponent shown in decimal, and f is fraction in binary.

In one embodiment, there are three classes of NNP-data-type-1 data, including numeric and related non-numeric entities. Each data item includes a sign, an exponent and a significand. The exponent is biased such that all biased exponents are non-negative unsigned numbers and the minimum biased exponent is zero. The significand includes an explicit fraction and an implicit unit bit to the left of the binary point. The sign bit is zero for plus and one for minus.

All non-zero finite numbers permitted have a unique NNP-data-type-1 representation. There are no subnormal numbers, which numbers might allow multiple representations for the same values, and there are no subnormal arithmetic operations. The three classes include, for instance:

| Data Class | Sign | Biased Exponent | Unit Bit* | Fraction |
| --- | --- | --- | --- | --- |
| Zero | ± | 0 | 0 | 0 |
| Normal numbers | ± | 0 | 1 | Not 0 |
| Normal numbers | ± | Not 0, not all ones | 1 | Any |
| Normal numbers | ± | All ones | — | Not all ones |
| NINF | ± | All ones | — | All ones |

Where: — indicates does not apply, * indicates the unit bit is implied, NINF is not a number or infinity.

Further details regarding each of the classes are described below:

Zeros: Zeros have a biased exponent of zero and a zero fraction. The implied unit bit is zero.

Normal Numbers: Normal numbers may have a biased exponent of any value. When the biased exponent is 0, the fraction is to be non-zero. When the biased exponent is all ones, the fraction is not to be all ones. Other biased exponent values may have any fraction value. The implied unit bit is one for all normal numbers.

NINF: A NINF is represented by a biased exponent of all ones and a fraction of all ones. A NINF represents a value not in the range of representable values in NNP-data-type-1 (i.e., 16-bit floating point designed for deep learning that has 6 exponent bits and 9 fraction bits). Normally, NINFs are just propagated during computations so that they will remain visible at the end.

Although the NNP-data-type-1 data type is supported in one example, other specialized or non-standard data types may be supported, as well as one or more standard data types including, but not limited to: IEEE 754 short precision, binary floating-point 16-bit, IEEE half precision floating point, 8-bit floating point, 4-bit integer format and/or 8-bit integer format, to name a few. These data formats have different qualities for neural network processing. As an example, smaller data types (e.g., less bits) can be processed faster and use less cache/memory, and larger data types provide greater result accuracy in the neural network. A data type to be supported may have one or more assigned bits in the query parameter block (e.g., in installed data types field 336 of parameter block 330). For instance, specialized or non-standard data types supported by a particular processor are indicated in the installed data types field but standard data types are not indicated. In other embodiments, one or more standard data types are also indicated. Other variations are possible.

In one particular example, bit 0 of installed data types field 336 is reserved for the NNP-data-type-1 data type, and when it is set to, e.g., 1, it indicates that the processor supports NNP-data-type-1. As an example, the bit vector of installed data types is configured to represent up to 16 data types, in which a bit is assigned to each data type. However, a bit vector in other embodiments may support more or fewer data types. Further, a vector may be configured in which one or more bits are assigned to a data type. Many examples are possible and/or additional, fewer and/or other data types may be supported and/or indicated in the vector.

In one example, the query function obtains an indication of the data types installed on the model-dependent processor and places the indication in the parameter block by, e.g., setting one or more bits in installed data types field 336 of parameter block 330. Further, in one example, the query function obtains an indication of installed data layout formats (another data attribute) and places the information in the parameter block by, e.g., setting one or more bits in installed data layout formats field 338. Example data layout formats include, for instance, 4D-feature tensor layout and 4D-kernel tensor layout. The 4D-feature tensor layout is used, in one example, by the functions described herein and in one example, the convolution function uses the 4D-kernel tensor layout. These data layout formats arrange data in storage for a tensor in a way that increases processing efficiency in execution of the functions of the Neural Network Processing Assist instruction. For instance, to operate efficiently, the Neural Network Processing Assist instruction uses input tensors provided in particular data layout formats. Although example layouts are provided, additional, fewer and/or other layouts may be provided for the functions described herein and/or other functions.

The use or availability of layouts for a particular processor model is provided by the vector of installed data layout formats (e.g., field 338 of parameter block 330). The vector is, for instance, a bit vector of installed data layout formats that allows the CPU to convey to applications which layouts are supported. For instance, bit 0 is reserved for the 4D-feature tensor layout, and when it is set to, e.g., 1, it indicates that the processor supports a 4D-feature tensor layout; and bit 1 is reserved for the 4D-kernel tensor layout, and when it is set to, e.g., 1, it indicates that the processor supports a 4D-kernel tensor layout. In one example, the bit vector of installed data layout formats is configured to represent up to 16 data layouts, in which a bit is assigned to each data layout. However, a bit vector in other embodiments may support more or fewer data layouts. Further, a vector may be configured in which one or more bits are assigned to data layouts. Many examples are possible. Further details regarding the 4D-feature tensor layout and the 4D-kernel tensor layout are described below. Again, other layouts may be used now or in the future to optimize performance.

In one example, the Neural Network Processing Assist instruction operates with 4D-tensors, i.e., tensors with 4 dimensions. These 4D-tensors are obtained from generic input tensors described herein in, e.g., row-major, i.e., when enumerating the tensor elements in increasing memory address order, the inner dimension called E1 will be stepped up first through the E1-index-size values starting with 0 through the E1-index-size-1, before the index of the E2 dimension will be increased and the stepping through the E1 dimension is repeated. The index of the outer dimension called the E4 dimension is increased last.

Tensors that have a lower number of dimensions (e.g., 3D- or 1D-tensors) will be represented as 4D-tensors with one or more dimensions of the 4D-tensor exceeding the original tensor dimensions set to 1.

The transformation of a row-major generic 4D-tensor with dimensions E4, E3, E2, E1 into a 4D-feature tensor layout (also referred to herein as NNPA data layout format 0 4D-feature tensor) is described herein:

A resulting tensor can be represented, for instance, as a 4D-tensor of, e.g., 64-element vectors or a 5D-tensor with dimensions:

E4, ⌈E1/64⌉, E3, ⌈E2/32⌉*32, 64, where ⌈ ⌉ refers to a ceil function. (Stated another way: E4* E3* ceil (E2/32)*32* ceil (E1/64)*64 elements.)

An element [e4][e3][e2][e1] of the generic tensor may be mapped to the following element of the resulting 5D-tensor:

[e4][⌊e1/64⌋][e3][e2][e1 MOD 64], where ⌊ ⌋ is a floor function and mod is modulo. (Stated another way: element (E3* e2_limit*e1_limit*e4x)+(e2_limit*e3x*64)+(e2x* 64)+(⌊e1x/64⌋ * e2 limit*E3*64)+(e1x mod 64), where e2 limit=⌈E2/32 ⌉*32 and e1_limit=⌈E1/64⌉*64.)

The resulting tensor may be larger than the generic tensor. Elements of the resulting tensor with no corresponding elements in the generic tensor are called pad elements.

Consider the element [fe4][fe1][fe3][fe2][fe0] of a NNPA data layout format 0 4D-feature tensor of a 64-element vector or its equivalent representation as a 5D-tensor of elements. This element is either a pad element or its corresponding element in the generic 4D tensor with dimensions E4, E3, E2, E1 can be determined with the following formula:

if fe2≥E2 then this is an E2 (or page)-pad element
  else if fe1*64+fe0≥E1 then this is an E1 (or row)-pad element
  else corresponding element in generic 4D tensor is:

[fe4][fe3][fe2][fe1*64+fe0]

For convolutional neural network based artificial intelligence models, the meaning of the 4 dimensions of a feature tensor can generally be mapped to:
  E4: N— Size of mini-batch
  E3: H— Height of the 3D-tensor/image
  E2: W— Width of the 3D-tensor/image
  E1: C— Channels or classes of the 3D-tensor For machine learning or recurrent neural network based artificial intelligence models, the meaning of the 4 dimensions of a 4D-feature tensor may generally be mapped to:
  E4: T— Number of time-steps or models
  E3: Reserved, generally set to 1
  E2: $N_{mb}$—Minibatch size
  E1: L— Features The NNPA data layout format 0 provides, e.g., two dimensional data locality with 4 k-Bytes blocks of data (pages) as well as 4 k-Byte block data alignment for the outer dimensions of the generated tensor.

Pad element bytes are ignored for the input tensors and unpredictable for output tensors. PER storage-alteration on pad bytes is unpredictable.

One example of an input data layout for a 4D-feature tensor layout, which has dimensions E1, E2, E3 and E4, is shown in FIGS. 5A-5C, and an example output for the 4D-feature tensor layout is depicted in FIGS. 6A-6C. Referring to FIG. 5A, a 3D-tensor 500 is shown, which has dimensions E1, E2 and E3. In one example, each 3D-tensor includes a plurality of 2D-tensors 502. The numbers in each 2D-tensor 502 describe memory offsets of where each of its elements would be in memory. The inputs are used to lay-out the data of the original tensor (e.g., original 4D-tensor of FIGS. 5A-5C) in memory, as shown in FIGS. 6A-6C, which correspond to FIGS. 5A-5C.

In FIG. 6A, as an example, a unit of memory 600 (e.g., a memory page) includes a pre-selected number (e.g., 32) of rows 602, each of which is identified by, e.g., e2_page_idx; and each row has a pre-selected number (e.g., 64) of elements 604, each identified by, e.g., e1_page_idx. If a row does not include the pre-selected number of elements, it is padded 606, referred to as row or E1 padding; and if the memory unit does not have a pre-selected number of rows, it is padded 608, referred to as page or E2 padding. As examples, the row padding is, e.g., zeros or other values, etc. and the page padding is, e.g., existing values, zeros, or other values.

In one example, output elements of a row are provided in memory (e.g., in a page) based on element positions in the E1 direction of its corresponding input. For instance, referring to FIG. 5A, element positions 0, 1 and 2 of the three matrices shown (e.g., element positions at a same location in each matrix) are shown in row 0 of page 0 of FIG. 6A, etc. In this example, the 4D-tensor is small and all of the elements of each 2D-tensor representing the 4D-tensor fits in one page. However, this is only one example. A 2D-tensor may include one or more pages. If a 2D-tensor is created based on a reformatting of a 4D-tensor, then the number of pages of the 2D-tensor is based on the size of the 4D-tensor. In one example, one or more ceil functions are used to determine the number of rows in a 2D-tensor and the number of elements in each row, which will indicate how many pages are to be used. Other variations are possible.

In addition to the 4D-feature tensor layout, in one example, a neural network processor may support a 4D-kernel tensor, which re-arranges the elements of a 4D-tensor to reduce the number of memory accesses and data gathering steps when executing certain artificial intelligence (e.g., neural network processing assist) operations, such as a convolution. As an example, a row-major generic 4D-tensor with dimensions E4, E3, E2, E1 is transformed into a NNPA data layout format 1 4D-kernel tensor (4D-kernel tensor), as described herein:

A resulting tensor can be represented as a 4D-tensor of, e.g., 64-element vectors or a 5D-tensor with dimensions:

$\lceil E1/64 \rceil$, E4, E3, $\lceil E2/32 \rceil$*32, 64, where $\lceil \, \rceil$ refers to a ceil function. (Stated another way: E4* E3* ceil (E2/32)*32* ceil (E1/64)*64 elements.)

An element [e4][e3][e2[e1] of the generic tensor may be mapped to the following element of the resulting 5D-tensor:

$[\lfloor e1/64 \rfloor][e4][e3][e2][e1 \bmod 64]$, where $\lfloor \, \rfloor$ refers to a floor function and mod is modulo. Stated another way: element ($\lfloor e1x/64 \rfloor$*E4* E3* e2_limit*64)+(e4x*E3* e2_limit*64)+(e3x*e2_limit*64)+(e2x*64)+(e1x mod 64), where e2_limit=$\lceil E2/32 \rceil$*32 and e1 limit=$\lceil E1/64 \rceil$*64.

The resulting tensor may be larger than the generic tensor. Elements of the resulting tensor with no corresponding elements in the generic tensor are called pad elements.

Consider the element [fe1][fe4][fe3][fe2][fe0] of a NNPA data layout format 1 4D-feature tensor of 64-element vectors or its equivalent representation as a 5D-tensor of elements. This element is either a pad element or its corresponding element in the generic 4D tensor with dimensions E4, E3, E2, E1 can be determined with the following formula:

if fe2≥E2 then this is an E2 (or page)-pad element
else if fe1*64+fe0≥E1 then this is an E1 (or row)-pad element
else corresponding element in generic 4D tensor is
[fe4][fe3][fe2][fe1*64+fe0]

For convolutional neural network based artificial intelligence models, the meaning of the 4 dimensions of a kernel tensor can generally be mapped to:

E4: H— Height of the 3D-tensor/image
E3: W— Width of the 3D-tensor/image
E2: C— Number of Channels of the 3D-tensor
E1: K— Number of Kernels The NNPA data layout format 1 provides, e.g., two dimensional kernel parallelism within 4 k-Byte blocks of data (pages) as well as 4 k-Byte block data alignment for the outer dimensions of the generate tensor for efficient processing.

Pad bytes are ignored for the input tensors. PER storage-alteration on pad bytes is unpredictable.

Again, although example data layout formats include a 4D-feature tensor layout and a 4D-kernel tensor layout, other data layout formats may be supported by the processor (e.g., neural network processor 105). An indication of supported data layouts is obtained and placed in the query parameter block by setting one or more bits in, e.g., field 338.

The query parameter block also includes, in accordance with one or more aspects of the present invention, other data attribute information, which includes, e.g., supported size information for the data. A processor, such as a neural network processor, typically has limitations based on internal buffer sizes, processing units, data bus structures, firmware limitations, etc. that can limit the maximum size of tensor dimensions and/or the overall size of a tensor. Therefore, the query function provides fields to convey these limits to applications. For instance, the processor, based on executing the query function, obtains various data sizes, such as a maximum dimension index size (e.g., 65,536 elements) and a maximum tensor size (e.g., 8 GB), and includes this information in fields 340 and 342, respectively, of the parameter block (e.g., parameter block 330). Additional, fewer and/or other size information may also be supported by the processor (e.g., neural network processor 105), and thus, obtained and placed in the parameter block, e.g., fields 340, 342 and/or other fields. In other embodiments, the limitations could be smaller or larger, and/or the sizes may be in other units, such as bytes instead of elements, elements instead of bytes, etc. Further, other embodiments allow for different maximum sizes of each dimension, rather than the same maximum for all dimensions. Many variations are possible.

In accordance with one or more aspects of the present invention, a query function is provided that conveys detailed information relating to a specific model of a selected processor (e.g., neural network processor 105). The detailed information includes, for instance, model-dependent information relating to a specific processor. (A processor may also support standard data attributes, such as standard data types, standard data layouts, etc., which are implied and not necessarily presented by the query function; although, in other embodiments, the query function may indicate all or various selected subsets of data attributes, etc.) Although example information is provided, other information may be provided in other embodiments. The obtained information, which may be different for different models of a processor and/or of different processors, is used to perform artificial intelligence and/or other processing. The artificial intelligence and/or other processing may employ one or more non-query functions of, e.g., the Neural Network Processing Assist instruction. A specific non-query function employed in the processing is performed by executing the Neural Network Processing Assist instruction one or more times and specifying the non-query specific function.

Further details of example non-query functions supported by the Neural Network Processing Assist instruction are described below (additional, fewer and/or other functions may be supported in other embodiments):

Function Code 16: NNPA-ADD (Addition)

When the NNPA-ADD function is specified, each element of the input tensor 1 described by tensor descriptor 1 is added to the corresponding element of the input tensor 2 described by tensor descriptor 2, and the resulting sum is placed in the corresponding element of the output tensor described by the output tensor descriptor.

In one example, if the specified data layout in any of the specified tensor descriptors does not specify a 4D-feature tensor (e.g., data layout=0) or if the data type in any specified tensor descriptor does not specify NNP-data-type-1 (e.g., data type=0), response code, e.g., 0010 hex or 0011 hex, respectively, is set in general register 0 and the instruction completes with condition code, e.g., 1.

The shape, the data layout and the data type of input tensor 1, input tensor 2 and the output tensor are to be the same, in one example; otherwise, a general operand data exception is recognized.

The output tensor descriptor 2, input tensor descriptor 3, function-specific-parameters 1-5 and function-specific-save-area-address fields are ignored, in one example.

Function Code 17: NNPA-SUB (Subtraction)

When the NNPA-SUB function is specified, each element of the input tensor 2 described by tensor descriptor 2 is subtracted from the corresponding element of the input tensor 1 described by tensor descriptor 1, and the resulting difference is placed in the corresponding element of the output tensor.

In one example, if the specified data layout in any of the specified tensor descriptors does not specify a 4D-feature tensor (e.g., data layout=0) or if the data type in any specified tensor descriptor does not specify NNP-data-type-1 (e.g., data type=0), response code, e.g., 0010 hex or 0011 hex, respectively, is set in general register 0 and the instruction completes with condition code, e.g., 1.

The shape, the data layout and the data type of input tensor 1, input tensor 2 and the output tensor are to be the same, in one example; otherwise, a general operand data exception is recognized.

The output tensor descriptor 2, input tensor descriptor 3, function-specific-parameters 1-5 and function-specific-save-area-address fields are ignored, in one example.

Function Code 18: NNPA-MUL (Multiplication)

When the NNPA-MUL function is specified, the product of each element of the input tensor 1 (the multiplier) described by tensor descriptor 1 and the corresponding element of the input tensor 2 (the multiplicand) described by tensor descriptor 2 is placed in the corresponding element of the output tensor.

In one example, if the specified data layout in any of the specified tensor descriptors does not specify a 4D-feature tensor (e.g., data layout=0) or if the data type in any specified tensor descriptor does not specify NNP-data-type-1 (e.g., data type=0), response code, e.g., 0010 hex or 0011 hex, respectively, is set in general register 0 and the instruction completes with condition code, e.g., 1.

The shape, the data layout and the data type of input tensor 1, input tensor 2 and the output tensor are to be the same, in one example; otherwise, a general operand data exception is recognized.

The output tensor descriptor 2, input tensor descriptor 3, function-specific-parameters 1-5 and function-specific-save-area-address fields are ignored, in one example.

Function Code 19: NNPA-DIV (Division)

When the NNPA-DIV function is specified, each element of the input tensor 1 described by tensor descriptor 1 (the dividend) is divided by the corresponding element of the input tensor 2 (the divisor) described by tensor descriptor 2, and the quotient is placed in the corresponding element of the output tensor.

In one example, if the specified data layout in any of the specified tensor descriptors does not specify a 4D-feature tensor (e.g., data layout=0) or if the data type in any specified tensor descriptor does not specify NNP-data-type-1 (e.g., data type=0), response code, e.g., 0010 hex or 0011 hex, respectively, is set in general register 0 and the instruction completes with condition code, e.g., 1.

The shape, the data layout and the data type of input tensor 1, input tensor 2 and the output tensor are to be the same, in one example; otherwise, a general operand data exception is recognized.

The output tensor descriptor 2, input tensor descriptor 3, function-specific-parameters 1-5 and function-specific-save-area-address fields are ignored, in one example.

Function Code 20: NNPA-MIN (Minimum)

When the NNPA-MIN function is specified, each element of the input tensor 1 described by tensor descriptor 1 is compared to the corresponding element of the input tensor 2 described by tensor descriptor 2. The smaller of the two values is placed into the corresponding element of the output tensor descriptor. If both values are equal, then the value is placed in the corresponding element of the output tensor.

In one example, if the specified data layout in any of the specified tensor descriptors does not specify a 4D-feature tensor (e.g., data layout=0) or if the data type in any specified tensor descriptor does not specify NNP-data-type-1 (e.g., data type=0), response code, e.g., 0010 hex or 0011 hex, respectively, is set in general register 0 and the instruction completes with condition code, e.g., 1.

The shape, the data layout and the data type of input tensor 1, input tensor 2 and the output tensor are to be the same, in one example; otherwise, a general operand data exception is recognized.

The output tensor descriptor 2, input tensor descriptor 3, function-specific-parameters 1-5 and function-specific-save-area-address fields are ignored, in one example.

Function Code 21: NNPA-MAX (Maximum)

When the NNPA-MAX function is specified, each element of the input tensor 1 described by tensor descriptor 1 is compared to the corresponding element of the input tensor 2 described by tensor descriptor 2. The greater of the two values is placed in the corresponding element of the output tensor descriptor. If both values are the same, then the value is placed in the corresponding element of the output tensor.

In one example, if the specified data layout in any of the specified tensor descriptors does not specify a 4D-feature tensor (e.g., data layout=0) or if the data type in any specified tensor descriptor does not specify NNP-data-type-1 (e.g., data type=0), response code, e.g., 0010 hex or 0011 hex, respectively, is set in general register 0 and the instruction completes with condition code, e.g., 1.

The shape, the data layout and the data type of input tensor 1, input tensor 2 and the output tensor are to be the same, in one example; otherwise, a general operand data exception is recognized.

The output tensor descriptor 2, input tensor descriptor 3, function-specific-parameters 1-5 and function-specific-save-area-address fields are ignored, in one example.

Function Code 32: NNPA-LOG (Natural Logarithm)

When the NNPA-LOG function is specified, for each element of the input tensor described by tensor descriptor 1, if that element is greater than zero, the corresponding element in the output tensor, described by the output tensor descriptor, is the natural logarithm of that element. Otherwise, the corresponding element in the output tensor is not numerically representable and the value associated with negative infinity in the target data type is stored.

In one example, if the specified data layout in any of the specified tensor descriptors does not specify a 4-D feature tensor (e.g., data layout=0) or if the data type in any specified tensor descriptor does not specify NNP-data-type-1 (e.g., data type=0), response code, e.g., 0010 hex or 0011 hex, respectively, is set in general register 0 and the instruction completes with condition code, e.g., 1.

The shape, the data layout and the data type of input tensor 1 and the output tensor are to be the same, in one example; otherwise, a general operand data exception is recognized.

The output tensor descriptor 2, input tensor descriptor 2, input tensor descriptor 3, function-specific-parameters 1-5 and function-specific-save-area-address fields are ignored, in one example.

Function Code 33: NNPA-EXP (Exponential)

When the NNPA-EXP function is specified, for each element of the input tensor described by tensor descriptor 1, the corresponding element in the output tensor described by the output tensor descriptor is the exponential of that element.

In one example, if the specified data layout in any of the specified tensor descriptors does not specify a 4D-feature tensor (e.g., data layout=0) or if the data type in any specified tensor descriptor does not specify NNP-data-type-1 (e.g., data type=0), response code, e.g., 0010 hex or 0011 hex, respectively, is set in general register 0 and the instruction completes with condition code, e.g., 1.

The shape, the data layout and the data type of input tensor 1 and the output tensor are to be the same, in one example; otherwise, a general operand data exception is recognized.

The output tensor descriptor 2, input tensor descriptor 2, input tensor descriptor 3, function-specific-parameters 1-5 and function-specific-save-area-address fields are ignored, in one example.

Function Code 49: NNPA-RELU (Rectified Linear Unit)

When the NNPA-RELU function is specified, for each element of the input tensor described by tensor descriptor 1, if that element is less than or equal to zero, the corresponding element in the output tensor described by the output tensor descriptor is zero. Otherwise, the corresponding element in the output tensor is the minimum of the element in the input tensor and the clipping value specified in function-specific-parameter 1.

As an example, function-specific-parameter 1 defines the clipping value for the RELU operation. For instance, the clipping value is in bits 16-31 of function-specific-parameter 1. The clipping value is specified in, e.g., the NNPA-data-type-1 format. A clipping value of zero indicates to use the maximum positive value; in other words, no clipping is performed. If a negative value is specified, a general operand data exception is recognized.

In one example, if the specified data layout in any of the specified tensor descriptors does not specify a 4D-feature tensor (e.g., data layout=0) or if the data type in any specified tensor descriptor does not specify NNP-data-type-1 (e.g., data type=0), response code, e.g., 0010 hex or 0011 hex, respectively, is set in general register 0 and the instruction completes with condition code, e.g., 1.

The shape, the data layout and the data type of input tensor 1 and the output tensor are to be the same, in one example; otherwise, a general operand data exception is recognized.

The output tensor descriptor 2, input tensor descriptor 2, input tensor descriptor 3, and function-specific-save-area-address fields are ignored, in one example. Function-specific-parameters 2-5 are to contain zeros, in one example.

Function Code 50: NNPA-TANH

When the NNPA-TANH function is specified, for each element of the input tensor described by tensor descriptor 1, the corresponding element value in the output tensor described by the output tensor descriptor is the hyperbolic tangent of that element.

In one example, if the specified data layout in any of the specified tensor descriptors does not specify a 4D-feature tensor (e.g., data layout=0) or if the data type in any specified tensor descriptor does not specify NNP-data-type-1 (e.g., data type=0), response code, e.g., 0010 hex or 0011 hex, respectively, is set in general register 0 and the instruction completes with condition code, e.g., 1.

The shape, the data layout and the data type of input tensor 1 and the output tensor are to be the same, in one example; otherwise, a general operand data exception is recognized.

The output tensor descriptor 2, input tensor descriptor 2, input tensor descriptor 3, function-specific-parameters 1-5 and function-specific-save-area-address fields are ignored, in one example.

Function Code 51: NNPA-SIGMOID

When the NNPA-SIGMOID function is specified, for each element of the input tensor described by tensor descriptor 1, the corresponding element in the output tensor described by the output tensor descriptor is the sigmoidal of that element.

In one example, if the specified data layout in any of the specified tensor descriptors does not specify a 4D-feature tensor (e.g., data layout=0) or if the data type in any specified tensor descriptor does not specify NNP-data-type-1 (e.g., data type=0), response code, e.g., 0010 hex or 0011 hex, respectively, is set in general register 0 and the instruction completes with condition code, e.g., 1.

The shape, the data layout and the data type of input tensor 1 and the output tensor are to be the same, in one example; otherwise, a general operand data exception is recognized.

The output tensor descriptor 2, input tensor descriptor 2, input tensor descriptor 3, function-specific-parameters 1-5 and function-specific-save-area-address fields are ignored, in one example.

Function Code 52: NNPA-SOFTMAX

When the NNPA-SOFTMAX function is specified, for each vector in dimension-1 of the input tensor 1, the corresponding vector in the output tensor is computed, as described below:

The maximum value of the vector is computed.
The summation of the exponentials of the difference between each element in dimension-1 of the vector and the maximum value computed above is computed. If both the element in dimension-1 of the input vector and the maximum value computed above are numeric values, and the difference is non-numeric, the result of the exponential for that element is forced to zero.

For each element in the vector, an intermediate quotient is formed of the exponential of the difference between the element and the maximum value computed above divided by the summation computed above. An optional activation function is applied to this intermediate quotient to form the corresponding element in the output vector.

This process is repeated for, e.g., all dimension-4-index-size x dimension-3-index-size x dimension-2-index-size vectors in dimension-1.

In one example, a NNPA-SOFTMAX function-specific-parameter 1 controls the activation function. As an example, an ACT field (e.g., bits 28-31) of function-specific-parameter 1 specifies the activation function. Example activation functions include:

| ACT | Activation Function |
|---|---|
| 0 | No activation function performed |
| 1 | LOG |
| 2-15 | Reserved |

If a reserved value is specified for the ACT field, a response code of, e.g., F001 hex, is reported and the operation completes with condition code, e.g., 1.

In one example, if the specified data layout in any of the specified tensor descriptors does not specify a 4D-feature tensor (e.g., data layout=0) or if the data type in any specified tensor descriptor does not specify NNP-data-type-1 (e.g., data type=0), response code, e.g., 0010 hex or 0011 hex, respectively, is set in general register 0 and the instruction completes with condition code, e.g., 1.

In one example, if the dimension-3-index-size of the input tensor is not equal to one, a response code of, e.g., F000 hex is stored and the instruction completes with condition codes, e.g., 1.

The shape, the data layout and the data type of input tensor 1 and the output tensor are to be the same, in one example; otherwise, a general operand data exception is recognized.

The output tensor descriptor 2, input tensor descriptor 2 and input tensor descriptor 3 are ignored, in one example. Function-specific parameters 2-5 are to contain zeros, in one example.

An 8 K-byte function specific save area may be used by this function.

In one embodiment, when obtaining the vector in dimension-1, the elements may not be contiguous in memory depending on the specified data layout format. If all elements of a dimension-1 vector of the input tensor 1 contain the largest magnitude negative number representable in the specified data type, results may be less accurate.

Function Code 64: NNPA-BATCHNORM (Batch Normalization)

When the NNPA-BATCHNORM function is specified, for each vector in dimension-1 of the input 1 tensor, the corresponding vector in dimension-1 of the output tensor is computed by multiplying each element in the vector by the corresponding element in the dimension-1 vector that makes up the input 2 tensor. The full precision product is then added to the corresponding element in the dimension-1 vector that makes up the input 3 tensor and then rounding to the precision of the specified data type of the output tensor.

This process is repeated for, e.g., all dimension-4-index-size×dimension-3-index-size×dimension-2-index-size vectors in dimension-1.

In one example, if the specified data layout in any of the specified tensor descriptors does not specify a 4D-feature tensor (e.g., data layout=0) or if the data type in any specified tensor descriptor does not specify NNP-data-type-1 (e.g., data type=0), response code, e.g., 0010 hex or 0011 hex, respectively, is set in general register 0 and the instruction completes with condition code, e.g., 1.

In one example, the following conditions are to be true, otherwise a general operand data exception is recognized:
The shape and the data layout of input tensor 1 and the output tensor are to be the same.
The data type of the input tensors and the output tensor are to be the same.
The dimension-1-index-size of input tensors 1, 2, 3 and the output tensor are to be the same.
The dimension 2, 3 and 4 index sizes of input tensors 2 and 3 are to be one.

The output tensor descriptor 2 and function-specific-save-area-address fields are ignored, in one example. Function-specific-parameters 2-5 are to contain zeros, in one example.

Function Code 80: NNPA-MAXPOOL2D
Function Code 81: NNPA-AVGPOOL2D

When either the NNPA-MAXPOOL2D or the NNPA-AVGPOOL2D function is specified, input tensor 1, described by the input tensor 1 descriptor, is reduced by the specified operation to summarize windows of the input. The windows of the input are selected by moving a 2D sliding window over dimension indices 2 and 3. The summary of the window is an element in the output tensor. The sliding window dimensions are described by, e.g., function-specific-parameter 4 and function-specific-parameter 5. The amount that the sliding window moves over the input 1 tensor when computing adjacent output tensor elements is called the stride. The sliding window stride is specified by, e.g., function-specific-parameter 2 and function-specific-parameter 3. When the NNPA-MAXPOOL2D operation is specified, the Max operation defined below is performed on the window. When the NNPA-AVGPOOL2D operation is specified, the AVG operation defined below is performed on the window. If the specified padding type is Valid, all elements in the window are added to the collection used to compute the resulting output element. If the specified padding type is Same, depending on the location of the window, only a subset of elements from the window may be added to the collection used to compute the resulting output element.

In one example, a CollectElements operation adds an element to the collection of elements and increments the number of elements in the collection. Each time the window start position moves, the collection is emptied. It is unpredictable whether elements not required to perform the operations are accessed.

Max Operation: In one example, the maximum value of the collection of elements in the window is computed by comparing all elements in the collection to each other and returning the largest value.

Avg (Average) Operation: In one example, the average value of the collection of elements in the window is computed as the summation of all elements in the collection divided by the number of elements in the collection.

In one example, fields are allocated as follows:
A pooling function-specific-parameter 1 controls the padding type. For instance, bits 29-31 of function-specific-parameter 1 include a PAD field that specifies the padding type. Example types include, for instance:

| PAD | Padding Type |
|---|---|
| 0 | Valid |
| 1 | Same |
| 2-7 | Reserved |

If a reserved value is specified for the PAD field, a response code of, e.g., F000 hex is reported and the operation completes with condition code, e.g., 1.

In one example, bit positions 0-28 of function-specific-parameter 1 are reserved and are to contain zeros.

Function-specific-parameter 2 contains, e.g., a 32-bit unsigned binary integer that specifies the dimension-2-stride (D2S) which specifies the number of elements the sliding window moves in dimension 2.

Function-specific-parameter 3 contains, e.g., a 32-bit unsigned binary integer that specifies the dimension-3-stride (D3S) which specifies the number of elements the sliding window moves in dimension 3.

Function-specific-parameter 4 contains, e.g., a 32-bit unsigned binary integer that specifies the dimension-2-window-size (D2WS) which specifies the number of elements in dimension 2 the sliding window contains.

Function-specific-parameter 5 contains, e.g., a 32-bit unsigned binary integer that specifies the dimension-3-window-size (D3WS) which specifies the number of elements in dimension 3 the sliding window contains.

In one example, the specified values in function-specific-parameters 2-5 are to be less than or equal to the maximum dimension index size, and the specified values in function-specific-parameters 4-5 are to be greater than zero; otherwise, response code, e.g., 0012 hex is reported and the operation completes with condition code, e.g., 1.

If the dimension-2-stride and the dimension-3-stride are both zero and either the dimension-2-window size or the dimension-3-window size is greater than, e.g., 1024, response code, e.g., F001 hex is stored. If the dimension-2-stride and the dimension-3-stride are both greater than, e.g., zero and either the dimension-2-window-size or the dimension-3-window-size is greater than, e.g., 64, response code, e.g., F002 hex is stored. If the dimension-2-stride and the dimension-3-stride are both greater than, e.g., zero and either the dimension-2 stride or the dimension-3 stride is greater than, e.g., 30, response code, e.g., F003 hex is stored. If the dimension-2-stride and the dimension-3-stride are both greater than, e.g., zero and either the input tensor dimension-2-index-size or the input tensor dimension-3-index-size is greater than, e.g., 1024, response code, e.g., F004 hex is stored. For all of the above conditions, the instruction completes with condition code, e.g., 1.

In one example, if the specified data layout in any of the specified tensor descriptors does not specify a 4D-feature tensor (e.g., data-layout=0) or if the data-type in any specified tensor descriptor does not specify NNP-data-type-1 (e.g., data-type=0), response code, e.g., 0010 hex or 0011 hex, respectively, is set in general register 0 and the instruction completes with condition code, e.g., 1.

In one example, the following conditions are to be true, otherwise, a general operand data exception is recognized:
The dimension-4-index-sizes and dimension-1-index-sizes of the input tensor and the output tensor are to be the same.
The data layout and the data type of the input tensor and the output tensor are to be the same.

If the dimension-2-stride and the dimension-3-stride are both zero, the following additional conditions are to be true, in one example:
The input tensor dimension-2-index-size is to be equal to the dimension-2-window size.
The input tensor dimension-3-index-size of the input tensor is to be equal to the dimension-3-window-size.
The dimension-2-index-size and the dimension-3-index-size of the output tensor to be one.
The specified padding is to be valid.

If either the dimension-2-stride or the dimension-3-stride is non-zero, then both strides are to be non-zero, in one example.

If the dimension-2-stride and the dimension-3-stride are both greater than zero, the following additional conditions are to be true, in one example:
When the specified padding is Valid, the dimension-2-window-size is to be less than or equal to the dimension-2-index-size of the input tensor.
When the specified padding is Valid, the dimension-3-window-size is to be less than or equal to the dimension-3-index-size of the input tensor.
When the specified padding is Same, the following relationships between the dimension-2-index-size and dimension-3-index size of the input and output tensors are to be satisfied (Pooling Same Padding):

$$O1D2IS = \left\lceil \frac{I1D2IS}{D2S} \right\rceil$$

$$O1D3IS = \left\lceil \frac{I1D3IS}{D3S} \right\rceil$$

where:
IxDyIS Dimension-y-index-size of the input tensor x defined in tensor descriptor x.
OxDyIS Dimension-y-index-size of the output tensor x defined in tensor descriptor x.
D2S Dimension-2-stride.
D3S Dimension-3-stride.

When the specified padding is Valid, the following relationships between the dimension-2-index-size and dimension-3-index-size of the input and output tensors are to be satisfied (Pooling Same Padding):

$$O1D2IS = \left\lceil \frac{(I1D2IS - D2WS + 1)}{D2S} \right\rceil$$

$$O1D3IS = \left\lceil \frac{(I1D3IS - D3WS + 1)}{D3S} \right\rceil$$

where D2WS is dimension-2-window size and D3WS is dimension-3-window size.

The output tensor descriptor 2, input tensor descriptors 2 and 3, and function-specific-save-area-address field are ignored.

Function Code 96: NNPA-LSTMACT (Long Short-Term Memory Activation)

When the NNPA-LSTMACT function is specified, input tensor 1, described by the input tensor 1 descriptor, split into four sub-tensors for each dimension 4 index value, along with input tensor 2 described by the input tensor 2 descriptor, split into four sub-tensors for each dimension 4 index value, and input tensor 3 described by the input tensor 3 descriptor are the inputs to a LSTMACT operation. At the end of the LSTMACT operation, results are written to output tensor 1 described by the output tensor 1 descriptor and output tensor 2 described by the output tensor 2 descriptor.

In one example, if the specified data layout in any of the specified tensor descriptors does not specify a 4D-feature tensor (e.g., data-layout=0) or if the data-type in any specified tensor descriptor does not specify NNP-data-type-1 (e.g., data-type=0), response code 0010 hex or 0011 hex, respectively, is set in general register 0 and the instruction completes with condition code, e.g., 1.

In one embodiment, the following conditions are to be true, otherwise, a general operand data exception is recognized:

The dimension-4-index-size for input tensor 3, and output tensors 1 and 2 are to be equal to, e.g., one.
The dimension-4-index-size for input tensor 1 and input tensor 2 are to be equal to, e.g., four.
The dimension-3-index-size for, e.g., all input tensors and the two output tensors are to be equal to, e.g., one.
The data layout and data type of, e.g., all input tensors and the two output tensors are to be the same.
The dimension-1-index-size of, e.g., all input tensors and the two output tensors are to be the same.
The dimension-2-index-size of, e.g., all input tensors and the two output tensors are to be the same.
The function-specific-save-area-address fields are ignored, in one example. Function-specific-parameters 1-5 are to contain zeros, in one example.

Function Code 97: NNPA-GRUACT (Gated Recurrent Unit Activation)

When the NNPA-GRUACT function is specified, input tensor 1, described by the input tensor 1 descriptor, split into three sub-tensors for each dimension 4 index value, along with input tensor 2 described by the input tensor 2 descriptor, split into three sub-tensors for each dimension 4 index value, and input tensor 3 described by the input tensor 3 descriptor are the inputs to a GRUACT operation. At the end of the GRUACT operation, the output tensor described by the output tensor descriptor is stored.

In one example, if the specified data layout in any of the specified tensor descriptors does not specify a 4D-feature tensor (e.g., data-layout=0) or if the data-type in any specified tensor descriptor does not specify NNP-data-type-1 (e.g., data-type=0), response code, e.g., 0010 hex or 0011 hex, respectively, is set in general register 0 and the instruction completes with condition code, e.g., 1.

In one embodiment, the following conditions are to be true, otherwise, a general operand data exception is recognized:

The dimension-4-index-size of the output tensor and input tensor 3 are to be equal to, e.g., one.
The dimension-4-index-size for the input tensor 1 and input tensor 2 are to be equal to, e.g., three.
The dimension-3-index-size for, e.g., all input tensors and the output tensor are to be equal to, e.g., one.
The dimension-1-index-size of, e.g., all input tensors and the output tensor are to be the same.
The dimension-2-index-size of, e.g., all input tensors and the output tensor are to be the same.
The data layout and data type of, e.g., all input tensors and the output tensor are to be the same.
The output tensor descriptor 2 and function-specific-save-area-address fields are ignored, in one example. Function-specific-parameters 2-5 are to contain zeros, in one example.

Function Code 112: NNPA-CONVOLUTION

When the NNPA-CONVOLUTION function is specified, for each output element in the output tensor described by the output tensor 1 descriptor, a 3-dimensional input-1 window consisting of dimension indices 3, 2, and 1 is selected from input tensor 1, described by the input tensor 1 descriptor. A 3-dimensional input-2 window of the same size consisting of dimension indices 4, 3, and 2 is selected from tensor 2, described by the input tensor 2 descriptor. The elements in the input-1 window are multiplied by the corresponding elements in the input-2 window and all of the products are added together to create an initial summation. This initial summation is added to the corresponding element of input tensor 3 to compute an intermediate summation value. The element of the output tensor is the result of the specified activation function performed on the intermediate summation. If no activation function is specified, the output element is equal to the intermediate summation.

If the specified padding type is Valid, all elements in the window are used to compute the resulting initial summation. If the specified padding type is Same, depending on the location of the window, some elements of the input-1 window may be implied zero, when computing the resulting initial summation.

It is unpredictable whether elements not required to perform the operation are accessed.

In one example, fields of a function-specific-parameter used by the convolution function are allocated, as follows:

A NNPA-CONVOLUTION function-specific-parameter 1 controls the padding type and the activation function. In one example, bits 29-31 of function-specific-parameter 1 include a PAD field that specifies the padding type.

Example types are below:

| PAD | Padding Type |
| --- | --- |
| 0 | Valid |
| 1 | Same |
| 2-7 | Reserved |

If a reserved value is specified for the PAD field, a response code of, e.g., F000 hex is reported and the operation completes with condition code, e.g., 1.

Further, in one example, bits 24-27 of the NNPA-CONVOLUTION function-specific-parameter 1 include an activation field that specifies activation functions. Example functions are below:

| ACT | Activation Function |
| --- | --- |
| 0 | No activation function performed |
| 1 | RELU |
| 2-15 | Reserved |

If an activation function of RELU is specified, the resulting output element value is determined, as follows: if the intermediate summation value is less than or equal to zero, the corresponding element in the output tensor is zero; otherwise, the corresponding element in the output tensor is the minimum of the intermediate summation value and the clipping value specified in function-specific-parameter 4.

If a reserved value is specified for the ACT field, a response code of, e.g., F001 hex is reported and the operation completes with condition code, e.g., 1.

Function-specific-parameter 2 contains, e.g., a 32-bit unsigned binary integer that specifies the dimension-2

(D2S) stride which specifies the number of elements the sliding window moves in dimension 2.

Function-specific-parameter 3 contains, e.g., a 32-bit unsigned binary integer that specifies the dimension-3 (D3S) stride which specifies the number of elements the sliding window moves in dimension 3.

The specified values in function-specific-parameters 2-3 are to be less than the maximum dimension index size; otherwise a response code, e.g., 0012 hex is reported and the operation completes with condition code, e.g., 1.

Function-specific-parameter 4 defines the clipping value for the optional RELU operation. In one example, the clipping value is in bits 16-31 of function-specific-parameter 4.

In one example, if the ACT field is zero, this field is ignored. If the ACT field specifies RELU, the clipping value is specified in NNP-data-type-1 format. A clipping value of zero indicates to use the maximum positive value; in other words, no clipping is performed. If a non-zero is specified, a general operand data exception is recognized.

In one example, if the specified data layout in any of the specified tensor descriptors except input tensor 2 does not specify a 4D-feature tensor (e.g., data-layout=0) or if the specified data layout in input tensor 2 does not specify a 4D-kernel tensor (e.g., data-layout=1), response code, e.g., 0010 hex is set in general register 0 and the instruction completes with condition code, e.g., 1. In one example, if the data-type in any specified tensor descriptor does not specify NNP-data-type-1 (e.g., data-type=0), response code, e.g., 0011 hex, is set in general register 0 and the instruction completes with condition code, e.g., 1.

If the dimension-2-stride and dimension-3-stride are both zero and the dimension-3-index size or the dimension-4-index size of input tensor 2 is greater than, e.g., 448, response code, e.g., F002 hex is stored. If the dimension-2-stride and the dimension-3-stride are both greater than zero and either the dimension-3-index size or the dimension-4-index-size of the input tensor 2 is greater than, e.g., 64, response code, e.g., F003 hex is stored and the operation completes with condition code, e.g., 1. If either the dimension 2 stride or the dimension 3 stride is greater than, e.g., 13, response code, e.g., F004 hex is stored and the operation completes with condition code, e.g., 1.

In one example, the following conditions are to be true, otherwise, a general operand data exception is recognized:

The data layout of input tensor 1, input tensor 3, and the output tensor are to be the same.

The data type of all input tensors and the output tensor are to be the same.

The dimension-2, dimension-3 and dimension-4 index sizes of the input 3 tensor are to be 1.

The dimension-4-index-size of the output tensor is to be equal to the dimension-4-index-size of the input 1 tensor.

The dimension-1-index-size of the output tensor is to be equal to the dimension-1 index size of the input 2 tensor and the dimension-1-index size of the input 3 tensor.

The dimension-1-index-size of the input 1 tensor is to be equal to the dimension-2 index size of the input 2 tensor.

If the dimension-2-stride and the dimension-3-stride are both zero, the following additional conditions are to be true, in one example:

The input 1 tensor dimension-2-index-size is to be equal to the dimension-3-index size of input 2 tensor.

The input 1 tensor dimension-3-index-size of the input tensor is to be equal to the dimension-4-index-size of input 2 tensor.

The dimension-2-index-size and the dimension-3-index-size of the output tensor are to be one.

The specified padding is to be Valid.

If either the dimension-2-stride or the dimension-3-stride is non-zero, then both strides are to be non-zero.

If the dimension-2-stride and the dimension-3-stride are both greater than zero, the following additional conditions are to be true, in one example:

When the specified padding is Valid, the dimension-2-index-size of the input 1 tensor is to be greater than or equal to the dimension-3-index-size of input tensor 2.

When the specified padding is Valid, the dimension-3-index-size of the input 1 tensor is to be greater than or equal to the dimension-4-index-size of the input 2 tensor.

When the specified padding is Same, the following relationships between the dimension-2-index-size and dimension-3-index-size of the input 1 tensor and output tensor is to be satisfied, in one example (Convolution Same Padding):

$$O1D2IS = \left\lceil \frac{I1D2IS}{D2S} \right\rceil$$

$$O1D3IS = \left\lceil \frac{I1D3IS}{D3S} \right\rceil$$

where:
O1D2IS Dimension-2-index-size of the output tensor.
O1D3IS Dimension-3-index-size of the output tensor.
I1D2IS Dimension-2-index-size of the input 1 tensor.
I1D3IS Dimension-3-index-size of the input 1 tensor.
D2S Dimension-2-Stride.
D3S Dimension-3-Stride.

When the specified padding is Valid, the following relationships between the dimension-2-index-size and dimension-3-index-size of the input 1 tensor, dimension-3-index-size and dimension-4-index-size of the input 2 tensor and output tensor are to be satisfied, in one example (Convolution Valid Padding):

$$O1D2IS = \left\lceil \frac{(I1D2IS - D2WS + 1)}{D2S} \right\rceil$$

$$O1D3IS = \left\lceil \frac{(I1D3IS - D3WS + 1)}{D3S} \right\rceil$$

where:
O1D2IS Dimension-2-index-size of the output tensor.
O1D3IS Dimension-3-index-size of the output tensor.
I1D2IS Dimension-2-index-size of the input 1 tensor.
I1D3IS Dimension-3-index-size of the input 1 tensor.
I2D3IS Dimension-3-index-size of the input 2 tensor.
I2D4IS Dimension-4-index-size of the input 2 tensor.
D2S Dimension-2-Stride.
D3S Dimension-3-Stride.

The output tensor descriptor 2 and the function specific save and address fields are ignored, in one example. Function-specific-parameter 5 to contain zeros, in one example.

Function Code 113: NNPA-MATMUL-OP (Matrix Multiplication Operation)

When the NNPA-MATMUL-OP function is specified, each element in the output tensor described by the output tensor descriptor is computed as described below, in one example:

A dimension-1-vector is selected from the input tensor 1, described by the input tensor 1 descriptor, using the get-dimension-1-vector operation described below.

A dimension-2-vector is selected from the input tensor 2, described by the input tensor 2 descriptor, using the get-dimension-2-vector operation described below.

An intermediate dot product of the dimension-1-vector and the dimension-2-vector is computed using the dot product operation described below.

An operation is performed on the intermediate dot product and the element of the input tensor 3, described by the input tensor 3 descriptor, with the same dimension index 4 and dimension index 1 values as the output tensor element. The resulting element is stored in the output tensor. A fused operation is determined by function-specific-parameter 1 and described below.

Get-dimension-1-vector Operation: For a specified output element, a dimension-1 vector is selected from the input-1 tensor where the input dimension-4-index is the output dimension-4-index, the input-dimension-3-index is the output dimension-3-index, and the input dimension-2-index is the output dimension-2-index.

Get-dimension-2-vector Operation: For a specified output element, a dimension-2 vector is selected from the input-2 tensor where the input dimension-4-index is the output dimension-4-index, the input-dimension-3-index is the output dimension-3-index, and the input dimension-1-index is the output dimension-1-index.

Dot Product Operation: The intermediate dot product of two vectors of the same size and data type is computed as the summation of products of each element in the input vector 1 and the corresponding element of the input vector 2.

Fused Operation: Function-specific-parameter 1 controls the operation performed on the intermediate dot product and the corresponding element from input tensor 3. In one example, a NNPA-MATMUL-OP function-specific-parameter 1 includes an operation field in, e.g., bits 24-31. The operation field specifies the operation performed. Example operations are indicated below:

| OPERATION | Operation Type |
|---|---|
| 0 | Addition |
| 1 | Compare if dot product is high |
| 2 | Compare if dot product is not low |
| 3 | Compare if dot product and element are equal |
| 4 | Compare if dot product and element are not equal |
| 5 | Compare if dot product is not high |
| 6 | Compare if dot product is low |

In one example, for an operation type of addition, the input tensor 3 element is added to the intermediate dot product. For operation types of comparison, the intermediate dot product is compared to the input tensor 3 element and if the comparison is true, the result is set to a value of, e.g., +1; otherwise, it is set to a value of, e.g., +0, in the data type specified for the output tensor.

In one example, all other values of the OPERATION field are reserved. If a reserved value is specified for the OPERATION field, a response code of, e.g., F000 hex, is reported and the operation completes with condition code, e.g., 1.

In one example, if the specified data layout in any of the specified tensor descriptors does not specify a 4D-feature tensor (e.g., data layout=0) or if the data-type in any specified tensor descriptor does not specify NNP-data-type-1 (e.g., data-type=0), response code, e.g., 0010 hex or 0011 hex, respectively, is set in general register 0 and the instruction completes with condition code, e.g., 1.

In one embodiment, the following conditions are to be true, otherwise, a general operand data exception is recognized:

The dimension-4-index-size of all input tensors and the output tensor are to be the same.

The dimension-3-index-size of all input tensors and the output tensor are to be equal to one.

The dimension-2-index-size of the input tensor 3 is to be equal to one.

The dimension-2-index-size of input tensor 1 and the output tensor are to be the same.

The dimension-1-index-size of input tensor 1 and the dimension-2-index-size of input tensor 2 are to be the same.

The dimension-1-index-size of input tensor 2, input tensor 3, and the output tensor are to be the same.

The data layout and data type of all input tensors and the output tensor are to be the same.

In one embodiment, the output tensor descriptor 2 and function-specific-save-area-address fields are ignored. Function-specific-parameters 2-5 are to contain zeros, in an example.

Function Code 114: NNPA-MATMUL-OP-BCAST23 (Matrix Multiplication Operation—Broadcast 23)

When the NNPA-MATMUL-OP-BCAST23 function is specified, each element in the output tensor described by the output tensor descriptor is computed, as described below, in one example:

A dimension-1-vector is selected from the input tensor 1, described by the input tensor 1 descriptor, using the get-dimension-1-vector operation described below.

A dimension-2-vector is selected from the input tensor 2, described by the input tensor 2 descriptor, using the get-dimension-2-vector operation described below.

The dot product of a dimention-1-vector and a dimension-2-vector is computed using the dot product operation described below.

The element of the input tensor 3, described by the input tensor 3 descriptor, with the same dimension index 1 value as the output tensor element is added to the previously computed dot product and stored in the output tensor.

Get-dimension-1-vector Operation: For a specified output element, a dimension-1 vector is selected from the input-1 tensor where the input dimension-4-index is the output dimension-4-index, the input-dimension-3-index is the output dimension-3-index, and the input dimension-2-index is the output dimension-2-index.

Get-dimension-2-vector Operation: For a specified output element, a dimension-2 vector is selected from the input-2 tensor where the input dimension-4-index is one, the input-dimension-3-index is the output dimension-3-index, and the input dimension-1-index is the output dimension-1-index.

Dot Product Operation: The intermediate product of two vectors of the same size and data type is computed as the summation of products of each element in the input vector 1 and the corresponding element of the input vector 2.

In one example, if the specified data layout in any of the specified tensor descriptors does not specify a 4D-feature tensor (e.g., data layout=0) or if the data-type in any specified tensor descriptor does not specify NNP-data-type-1 (e.g., data-type=0), a response code, e.g., 0010 hex or 0011 hex, respectively, is set in general register 0 and the instruction completes with condition code, e.g., 1.

In one embodiment, the following conditions are to be true, otherwise, a general operand data exception is recognized:

- The dimension-4-index-size of the input tensor 1 and the output tensor are to be the same.
- The dimension-4-index-size of input tensor 2 and input tensor 3 are to be equal to one.
- The dimension-3-index-size of all input tensors and the output tensor are to be equal to one.
- The dimension-2-index-size of input tensor 3 is to be equal to one.
- The dimension-2-index-size of input tensor 1 and the output tensor are to be the same.
- The dimension-1-index-size of input tensor 1 and the dimension-2-index-size of input tensor 2 are to be the same.
- The dimension-1-index-size of input tensor 2, input tensor 3, and the output tensor are to be the same.
- The data layout and data type of all input tensors and the output tensor are to be the same.

In one embodiment, the output tensor descriptor 2 and function-specific-save-area-address fields are ignored. Function-specific-parameters 1-5 are to contain zeros, in one example.

For the Neural Network Processing Assist instruction, in one embodiment, if the output tensor overlaps with any input tensor or the parameter block, results are unpredictable.

A specification exception is recognized when execution of the Neural Network Processing Assist instruction is attempted and the parameter block is not designated on, e.g., a doubleword boundary, as an example.

A general operand data exception is recognized when execution of the Neural Network Processing Assist instruction is attempted and there are, for instance, tensor descriptor inconsistencies.

Resulting Condition Codes for the Neural Network Processing Assist instruction include, for instance: 0-Normal completion; 1-Response code is set; 2-; 3-CPU-determined amount of data processed.

In one embodiment, the priority of execution for the Neural Network Processing Assist instruction includes, for instance:

1-7. Exceptions with the same priority as the priority of program interruption conditions for the general case.

8.A Condition code 1 due to an unassigned or uninstalled function code specified.

8.B Specification exception due to parameter block not designated on doubleword boundary.

9. Access exceptions for an access to the parameter block.

10. Condition code 1 due to specified format of the parameter block not supported by the model.

11.A Condition code 1 due to the specified tensor data layouts are not supported.

11.B General operand data exception due to differing data layouts between tensor descriptors.

12.A Condition code 1 due to conditions other than those included in items 8.A, 10 and 11.A above and 12.B.1 below.

12.B.1 Condition code 1 due to invalid output tensor data type for NNPA-RELU and
NNPA-CONVOLUTION.

12.B.2 General operand data exception for invalid value for NNPA-RELU function-specific-parameter 1 and NNPA-CONVOLUTION function-specific-parameter 4.

13.A Access exceptions for an access to the output tensor.
13.B Access exceptions for an access to the input tensors.
13.C Access exceptions for an access to the function-specific-save-area.
14. Condition code 0.

As described herein, a single instruction (e.g., the Neural Network Processing Assist instruction) is configured to perform a plurality of functions, including a query function and a plurality of non-query functions. Each non-query function may operate on large amounts of data, and therefore, the function is performed in processing phases. During each processing phase, up to a select amount of data may be stored into a select location, e.g., memory. The select amount of data depends on the function being performed. If, during a particular phase, a determination is made that a store to the designated area occurred (e.g., actual store occurs to the designated area; a parameter block and/or a function specific save area, if defined to be used by the function, completely overlaps the designated area; a parameter block and/or function save area, if defined to be used by the function, partially overlaps the designated area and there is a store in the overlapping portion; and/or a parameter block and/or function save area, if defined to be used by the function, partially overlaps the designated area, regardless if there is a store in the overlapping portion), an interrupt occurs and the instruction completes with a condition code of, e.g., 3. By checking whether a store into the designated area occurred after a processing phase, a store into the designated area only occurs within a single phase prior to ending the instruction. Since a select amount of data is stored during each phase and the select amount may be greater than 4K, a reduced number of checks may be needed for testing of whether there was a store into the designated area (e.g., if processing multiple contiguous 4K pages). For instance, a test after each 4K page is not needed. The Neural Network Processing Assist instruction, as an example, is able to store more than 4K additional bytes to each operand location intersecting with the designated program event recording storage area before the event is indicated by an interrupt.

One or more aspects of the present invention are inextricably tied to computer technology and facilitate processing within a computer, improving performance thereof. The use of a single architected machine instruction configured to perform various functions improves performance within the computing environment by reducing complexity, reducing use of resources and increasing processing speed. Further, by enhancing the program event recording facility, the debugging of programs is facilitated and program complexity and/or programming errors are reduced, improving system performance. As examples, program event recording is enhanced by allowing the instruction to store more than 4K additional bytes to each operand location intersecting with the designated program event recording storage area before the event is indicated by an interrupt; by only storing into a designated area within a single processing phase prior to interrupting; and/or by reducing the number of program event recording checks since more than 4K pages may be stored prior to a check. Further, in one or more embodiments, complexity is reduced for, e.g., verification programs, which may predict a storage alteration interrupt, increasing verification quality. For instance, based on a memory access pattern corresponding to the function code, verification programs can predict exactly after which phase the instruction would present the program event recording interrupt; and verification programming can predict the interrupt in case of a program event recording designated area being located within the parameter block and/or the function specific save area, as the interrupt would be presented after each phase. Programs may make use of program event recording storage alterations to identify, for instance, unintended memory updates. The obtained information, program event recording facility and/or instruction may be used in many technical fields, such as in computer processing, medical processing, engineering, automotive technologies, manufacturing, etc. By providing optimizations in obtaining the information and/or enhancing program event recording, these technical fields are improved by, e.g., reducing errors and/or execution time.

Further details of one embodiment of facilitating processing within a computing environment, as it relates to one or more aspects of the present invention, are described with reference to FIGS. 7A and 7B.

Referring to FIG. 7A, in one embodiment, instruction processing is performed for an instruction 700. The instruction is configured to perform a plurality of functions 702. A function of the plurality of functions is to be performed in a plurality of processing phases 704, in which a processing phase of the plurality of processing phases is defined to store up to a select amount of data 706. The select amount of data is based on the function of the plurality of functions to be performed 708. At least one function of the plurality of functions has a different value for the select amount of data than at least one other function of the plurality of functions 710. A determination is made as to whether a store into a designated area occurred based on processing a select processing phase of the plurality of processing phases of a select function 712. Based on determining that the store into the designated area occurred, an interrupt is presented 714, and based on determining that the store into the designated area did not occur, the performing instruction processing continues 716.

The use of a single architected machine instruction configured to perform various functions improves performance within the computing environment by reducing complexity, reducing use of resources and/or increasing processing speed.

By checking whether a store into the designated area occurred after a processing phase, a store into the designated area only occurs within a single phase prior to ending the instruction. Since a select amount of data is stored during each phase and the select amount may be greater than 4K, a reduced number of checks may be needed for testing of whether there was a store into the designated area (e.g., if processing multiple contiguous 4K pages).

In one example, the continuing with performing instruction processing includes proceeding to processing of a next processing phase of the select function 720. As another example, the continuing with performing instruction processing includes ending the instruction 722.

As an example, the designated area includes an area of memory defined by a starting address and an ending address 724. The starting address and the ending address are provided by, for instance, one or more control registers 726.

In one embodiment, referring to FIG. 7B, the determining whether the store into the designated area occurred includes checking whether a memory address to which data is being written is in the designated area 730, and based on the memory address being in the designated area, the determining indicates that there is a store into the designated area 732.

In one embodiment, the determining whether the store into the designated area occurred includes checking whether at least a portion of a parameter block to be used by the select function overlaps the designated area 734, and based on the at least a portion of the parameter block overlapping the designated area, the determining indicates that there is a store into the designated area 736.

The checking for an overlap of the parameter block may cause an interrupt after each phase, readily providing information about the memory accesses.

In one embodiment, the determining whether the store into the designated area occurred includes checking whether at least a portion of a function specific save area to be used by the function overlaps the designated area 738, and based on the at least a portion of the function specific save area overlapping the designated area, the determining indicates that there is a store into the designated area 740.

The checking for an overlap of the function specific save area, if to be used, may cause an interrupt after each phase readily providing information about the memory accesses.

In one or more aspects, certain predictions may be made. For instance, it is predicted that a particular processing phase of the plurality of processing phases of the select function will cause an interrupt 750, in which the predicting is based on a memory access pattern of the select function being performed 752. As a further example, it is predicted that an interrupt will occur based on determining that at least a portion of a parameter block to be used by the select function overlaps the designated area 754 and/or it is predicted that an interrupt will occur based on determining that at least a portion of a function specific save area to be used by the select function overlaps the designated area 756.

Complexity is reduced, at the very least, for verification programs, which may predict a storage alteration interrupt, increasing verification quality. For instance, based on a memory access pattern corresponding to the function code, verification programs can predict exactly after which phase the instruction would interrupt and present the program event recording interrupt; and verification programming can predict the interrupt in case of a program event recording designated area being located within the parameter block and/or the function specific save area, as the interrupt would be presented after each phase Other variations and embodiments are possible.

Figure 8A:
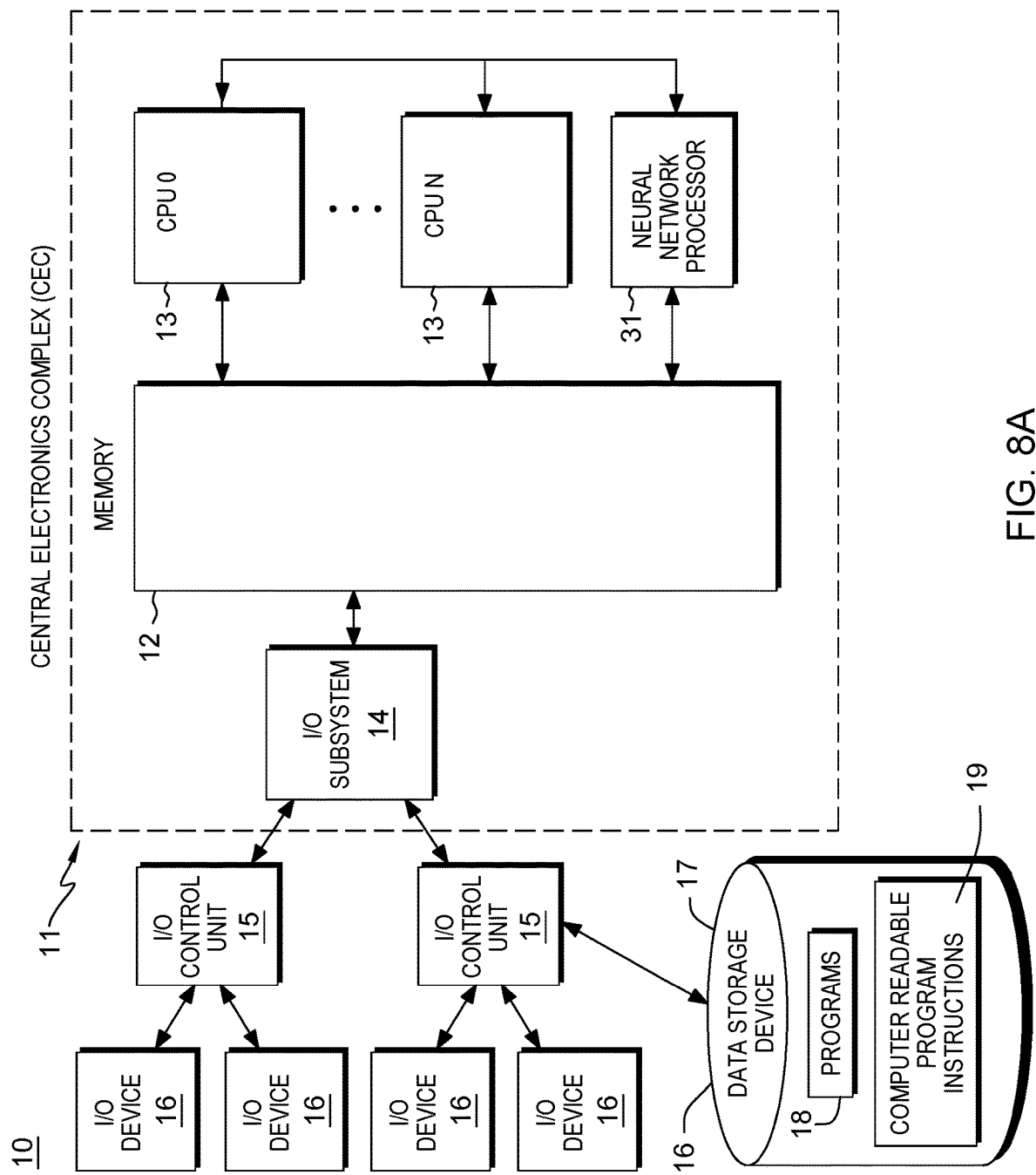
FIG. 8A depicts another example of a computing environment to incorporate and use one or more aspects of the present invention.

Aspects of the present invention may be used by many types of computing environments. Another example of a computing environment to incorporate and use one or more aspects of the present invention is described with reference to FIG. 8A. As an example, the computing environment of FIG. 8A is based on the z/Architecture® instruction set architecture offered by International Business Machines Corporation, Armonk, N.Y. The z/Architecture instruction set architecture, however, is only one example architecture. Again, the computing environment may be based on other architectures, including, but not limited to, the Intel® x86 architectures, other architectures of International Business Machines Corporation, and/or architectures of other companies. Intel is a trademark or registered trademark of Intel Corporation or its subsidiaries in the United States and other countries.

In one example, a computing environment 10 includes a central electronics complex (CEC) 11. Central electronics complex 11 includes a plurality of components, such as, for instance, a memory 12 (a.k.a., system memory, main memory, main storage, central storage, storage) coupled to one or more processors, such as one or more general-purpose processors (a.k.a., central processing units (CPUs) 13) and one or more special-purpose processors (e.g., neural network processor 31), and to an input/output (I/O) subsystem 14.

As examples, the one or more special-purpose processors may be separate from the one or more general-purpose processors and/or at least one special-purpose processor may be embedded within at least one general-purpose processor. Other variations are also possible.

I/O subsystem 14 can be a part of the central electronics complex or separate therefrom. It directs the flow of information between main storage 12 and input/output control units 15 and input/output (I/O) devices 16 coupled to the central electronics complex.

Many types of I/O devices may be used. One particular type is a data storage device 17. Data storage device 17 can store one or more programs 18, one or more computer readable program instructions 19, and/or data, etc. The computer readable program instructions can be configured to carry out functions of embodiments of aspects of the invention.

Central electronics complex 11 can include and/or be coupled to removable/non-removable, volatile/non-volatile computer system storage media. For example, it can include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with central electronics complex 11. Examples include, but are not limited to: microcode or millicode, device drivers, redundant processing units, external disk drive arrays, RAID systems, tape drives, and data archival storage systems, etc.

Further, central electronics complex 11 can be operational with numerous other general-purpose or special-purpose computing system environments or configurations. Examples of well-known computing systems, environments, and/or configurations that may be suitable for use with central electronics complex 11 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 8B:
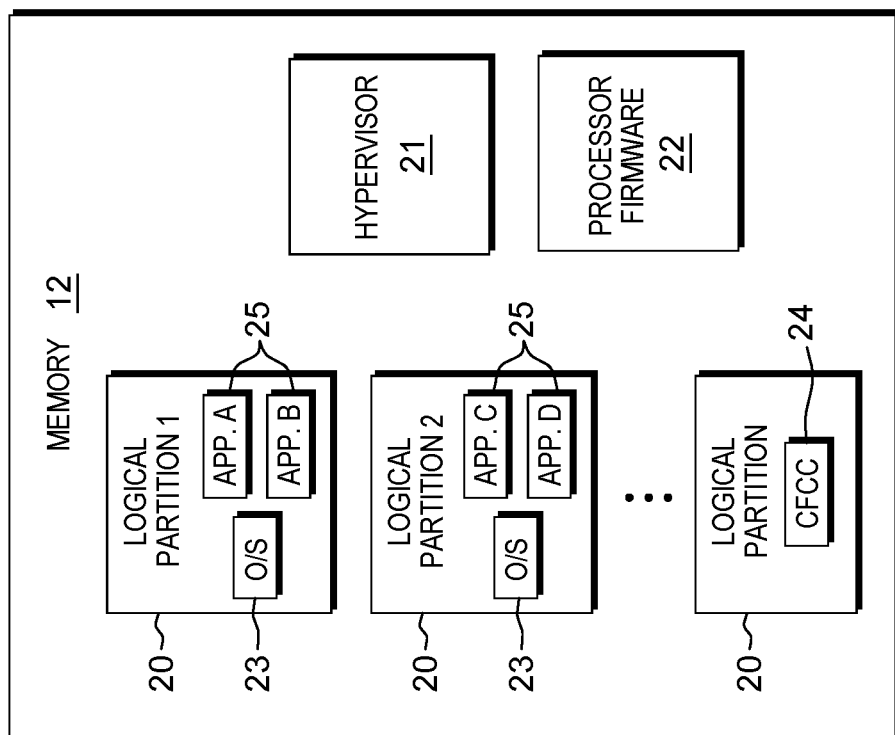
FIG. 8B depicts one example of further details of a memory of FIG. 8A, in accordance with one or more aspects of the present invention.

Central electronics complex 11 provides in one or more embodiments logical partitioning and/or virtualization support. In one embodiment, as shown in FIG. 8B, memory 12 includes, for example, one or more logical partitions 20, a hypervisor 21 that manages the logical partitions, and processor firmware 22. One example of hypervisor 21 is the Processor Resource/System Manager (PR/SM™), offered by International Business Machines Corporation, Armonk, N.Y. PR/SM is a trademark or registered trademark of International Business Machines Corporation in at least one jurisdiction.

Each logical partition 20 is capable of functioning as a separate system. That is, each logical partition can be independently reset, run a guest operating system 23 such as the z/OS® operating system, offered by International Business Machines Corporation, Armonk, N.Y., or other control code 24, such as coupling facility control code (CFCC), and operate with different programs 25. An operating system or application program running in a logical partition appears to have access to a full and complete system, but in reality, only a portion of it is available. Although the z/OS operating system is offered as an example, other operating systems offered by International Business Machines Corporation and/or other companies may be used in accordance with one or more aspects of the present invention.

Memory 12 is coupled to, e.g., CPUs 13 (FIG. 8A), which are physical processor resources that can be allocated to the logical partitions. For instance, a logical partition 20 may include one or more logical processors, each of which represents all or a share of a physical processor resource 13 that can be dynamically allocated to the logical partition.

Figure 8C:
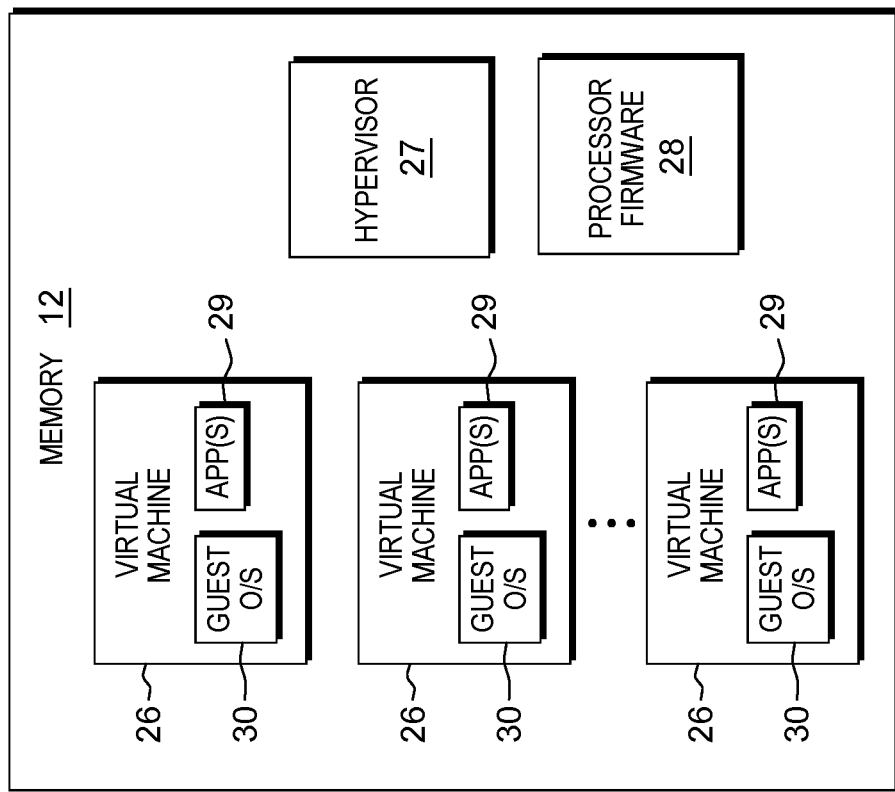
FIG. 8C depicts another example of further details of a memory of FIG. 8A, in accordance with one or more aspects of the present invention.

In yet a further embodiment, the central electronics complex provides virtual machine support (either with or without logical partitioning support). As shown in FIG. 8C, memory 12 of central electronics complex 11 includes, for example, one or more virtual machines 26, a virtual machine manager, such as a hypervisor 27, that manages the virtual machines, and processor firmware 28. One example of hypervisor 27 is the z/VM® hypervisor, offered by International Business Machines Corporation, Armonk, N.Y. The hypervisor is sometimes referred to as a host. z/VM is a trademark or registered trademark of International Business Machines Corporation in at least one jurisdiction.

The virtual machine support of the central electronics complex provides the ability to operate large numbers of virtual machines 26, each capable of operating with different programs 29 and running a guest operating system 30, such as the Linux® operating system. Each virtual machine 26 is capable of functioning as a separate system. That is, each virtual machine can be independently reset, run a guest operating system, and operate with different programs. An operating system or application program running in a virtual machine appears to have access to a full and complete system, but in reality, only a portion of it is available. Although z/VM and Linux are offered as examples, other virtual machine managers and/or operating systems may be used in accordance with one or more aspects of the present invention. The registered trademark Linux® is used pursuant to a sublicense from the Linux Foundation, the exclusive licensee of Linus Torvalds, owner of the mark on a worldwide basis.

Figure 9A:
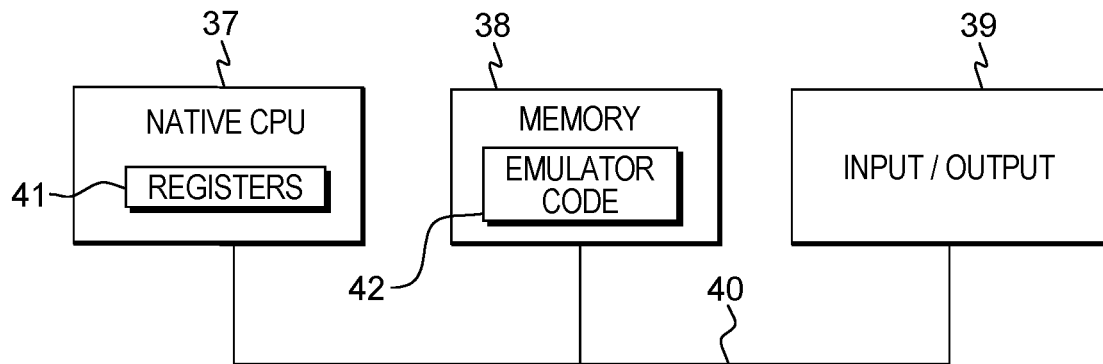
FIG. 9A depicts yet another example of a computing environment to incorporate and use one or more aspects of the present invention.

Another embodiment of a computing environment to incorporate and use one or more aspects of the present invention is described with reference to FIG. 9A. In this example, a computing environment 36 includes, for instance, a native central processing unit (CPU) 37, a memory 38, and one or more input/output devices and/or interfaces 39 coupled to one another via, for example, one or more buses 40 and/or other connections. As examples, computing environment 36 may include a PowerPC® processor offered by International Business Machines Corporation, Armonk, N.Y.; an HP Superdome with Intel® Itanium® II processors offered by Hewlett Packard Co., Palo Alto, Calif.; and/or other machines based on architectures offered by International Business Machines Corporation, Hewlett Packard, Intel Corporation, Oracle, and/or others. PowerPC is a trademark or registered trademark of International Business Machines Corporation in at least one jurisdiction. Itanium is a trademark or registered trademark of Intel Corporation or its subsidiaries in the United States and other countries.

Native central processing unit 37 includes one or more native registers 41, such as one or more general purpose registers and/or one or more special purpose registers used during processing within the environment. These registers include information that represents the state of the environment at any particular point in time.

Moreover, native central processing unit 37 executes instructions and code that are stored in memory 38. In one particular example, the central processing unit executes emulator code 42 stored in memory 38. This code enables the computing environment configured in one architecture to emulate another architecture. For instance, emulator code 42 allows machines based on architectures other than the z/Architecture instruction set architecture, such as PowerPC processors, HP Superdome servers or others, to emulate the z/Architecture instruction set architecture and to execute software and instructions developed based on the z/Architecture instruction set architecture.

Figure 9B:
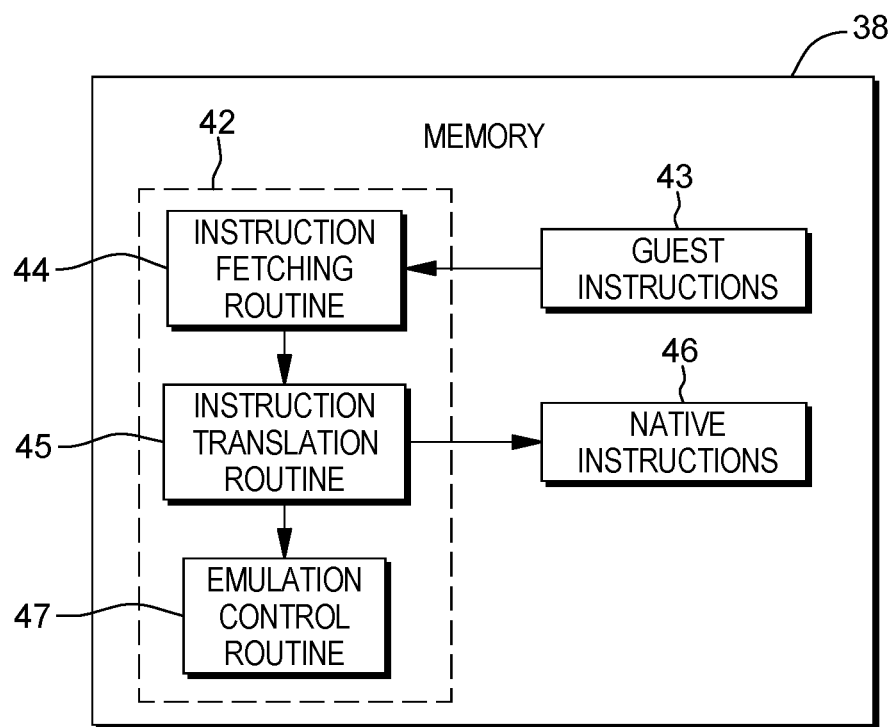
FIG. 9B depicts further details of the memory of FIG. 9A, in accordance with one or more aspects of the present invention.

Further details relating to emulator code 42 are described with reference to FIG. 9B. Guest instructions 43 stored in memory 38 comprise software instructions (e.g., correlating to machine instructions) that were developed to be executed in an architecture other than that of native CPU 37. For example, guest instructions 43 may have been designed to execute on a processor based on the z/Architecture instruction set architecture, but instead, are being emulated on native CPU 37, which may be, for example, an Intel Itanium II processor. In one example, emulator code 42 includes an instruction fetching routine 44 to obtain one or more guest instructions 43 from memory 38, and to optionally provide local buffering for the instructions obtained. It also includes an instruction translation routine 45 to determine the type of guest instruction that has been obtained and to translate the guest instruction into one or more corresponding native instructions 46. This translation includes, for instance, identifying the function to be performed by the guest instruction and choosing the native instruction(s) to perform that function.

Further, emulator code 42 includes an emulation control routine 47 to cause the native instructions to be executed. Emulation control routine 47 may cause native CPU 37 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 46 may include loading data into a register from memory 38; storing data back to memory from a register; or performing some type of arithmetic or logic operation, as determined by the translation routine.

Each routine is, for instance, implemented in software, which is stored in memory and executed by native central processing unit 37. In other examples, one or more of the routines or operations are implemented in firmware, hardware, software or some combination thereof. The registers of the emulated processor may be emulated using registers 41 of the native CPU or by using locations in memory 38. In embodiments, guest instructions 43, native instructions 46 and emulator code 42 may reside in the same memory or may be disbursed among different memory devices.

An instruction that may be emulated includes the Neural Network Assist Processing instruction described herein, in accordance with one or more aspects of the present invention. Further, other instructions and/or one or more aspects of the program event recording facility may be emulated, in accordance with one or more aspects of the present invention.

The computing environments described above are only examples of computing environments that can be used. Other environments, including but not limited to, non-partitioned environments, partitioned environments, cloud environments and/or emulated environments, may be used; embodiments are not limited to any one environment.

Although various examples of computing environments are described herein, one or more aspects of the present invention may be used with many types of environments. The computing environments provided herein are only examples.

Each computing environment is capable of being configured to include one or more aspects of the present invention.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
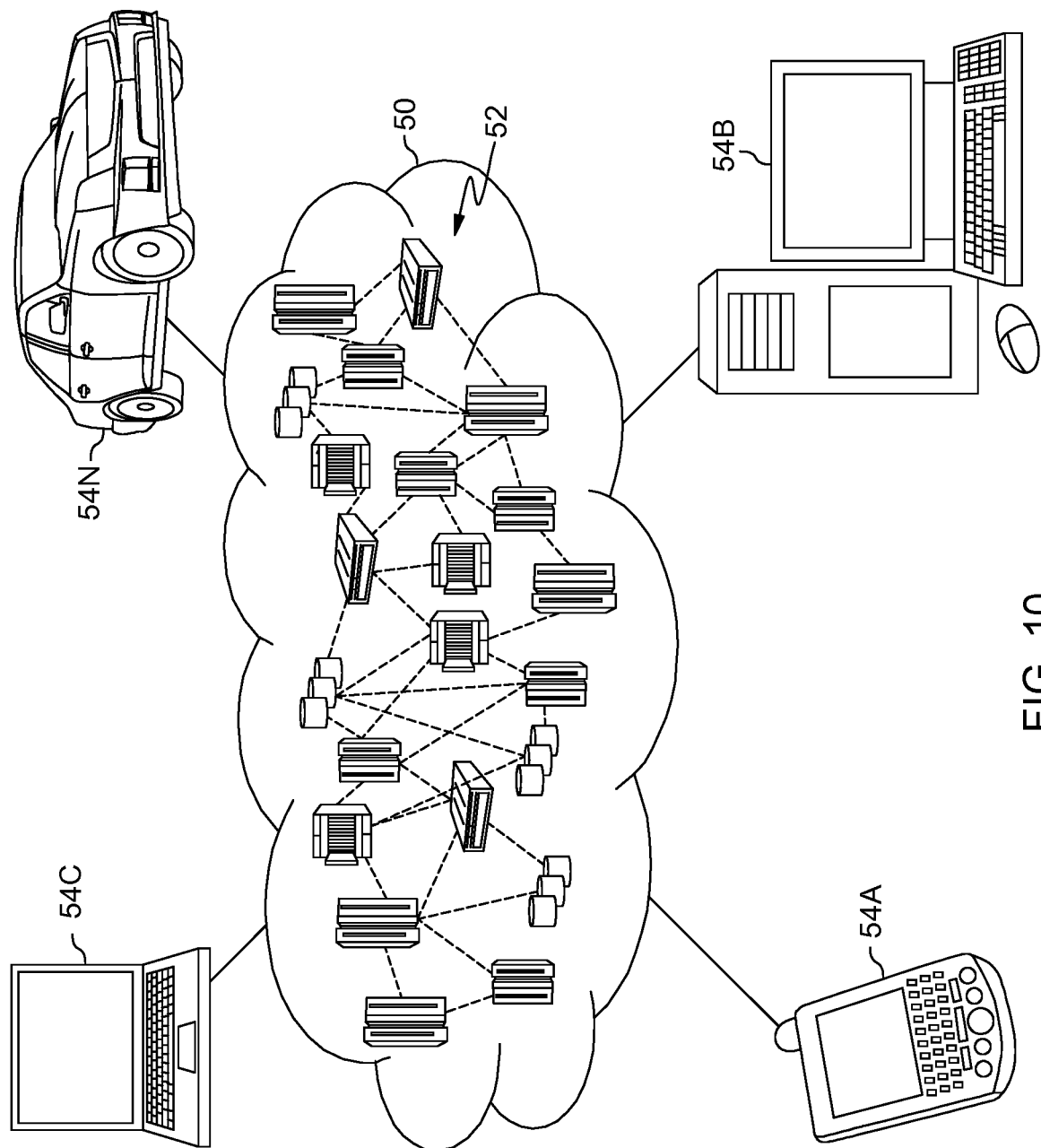
FIG. 10 depicts one embodiment of a cloud computing environment, in accordance with one or more aspects of the present invention.

Referring now to FIG. 10, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 52 and cloud computing environment 50 can communicate with any type of computerized device over any type of network and/or network addressable connection (e.g., using a web browser).

Figure 11:
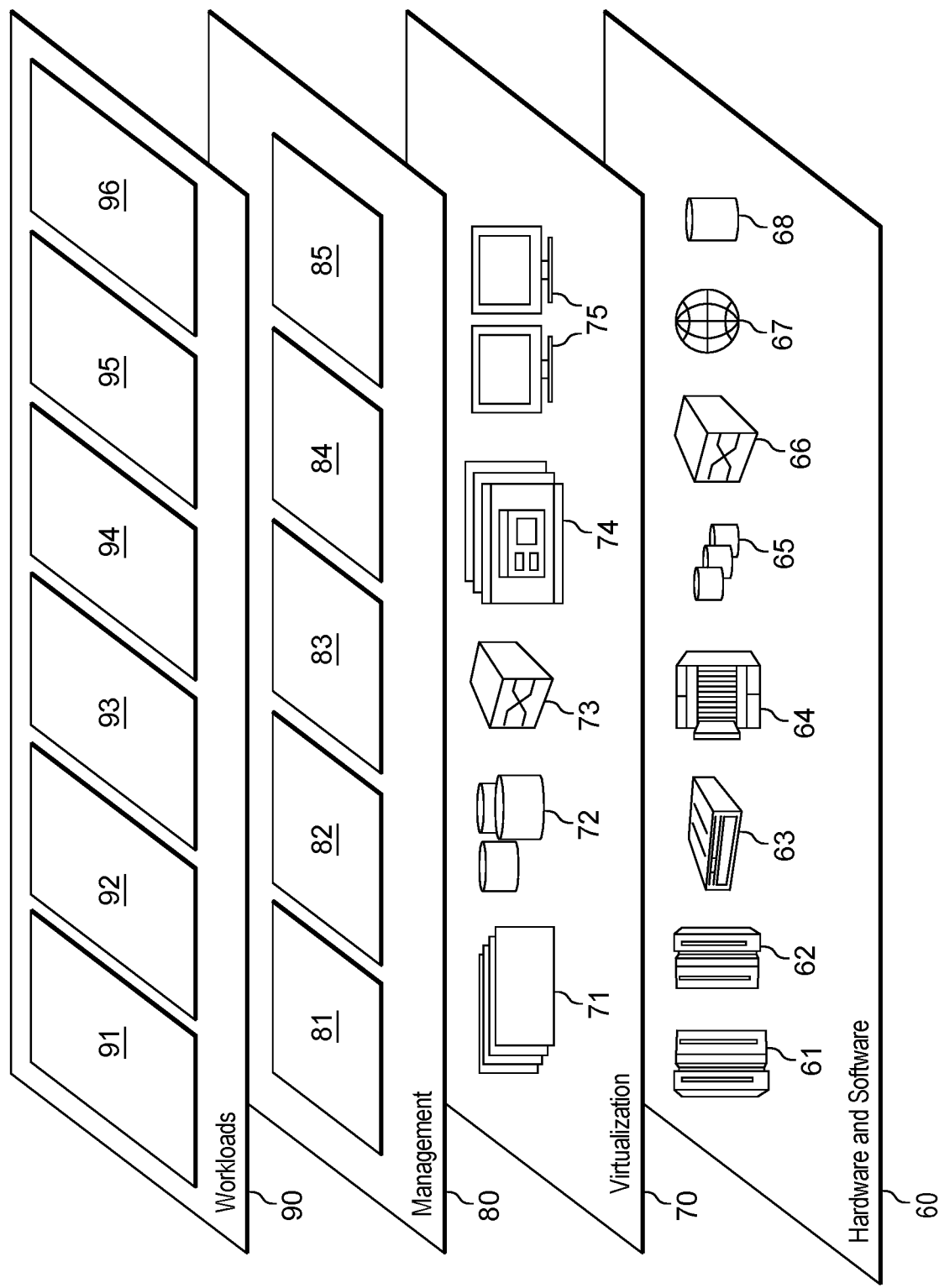
FIG. 11 depicts one example of abstraction model layers, in accordance with one or more aspects of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and program event recording and/or neural network processing assist processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For instance, computing environments of other architectures can be used to incorporate and/or use one or more aspects. Further, different instructions or operations may be used. Additionally, different types of registers and/or different registers may be used. Further, other data formats, data layouts and/or data sizes may be supported. In one or more embodiments, one or more general-purpose processors, one or more special-purpose processors or a combination of general-purpose and special-purpose processors may be used. Many variations are possible.

Various aspects are described herein. Further, many variations are possible without departing from a spirit of aspects of the present invention. It should be noted that, unless otherwise inconsistent, each aspect or feature described herein, and variants thereof, may be combinable with any other aspect or feature.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:

one or more computer readable storage media and program instructions collectively stored on the one or more computer readable storage media to perform a method comprising:

performing instruction processing for an instruction, the instruction configured to perform a plurality of functions, wherein a function of the plurality of functions is to be performed in a plurality of processing phases, wherein a processing phase of the plurality of processing phases is defined to store up to a select amount of data, the select amount of data being based on the function of the plurality of functions to be performed, wherein at least one function of the plurality of functions has a different value for the select amount of data than at least one other function of the plurality of functions;

determining whether a store into a designated area occurred based on processing a select processing phase of the plurality of processing phases of a select function;

presenting an interrupt, based on determining that the store into the designated area occurred; and continuing with performing instruction processing, based on determining that the store into the designated area did not occur.

2. The computer program product of claim 1, wherein the continuing with performing instruction processing includes proceeding to processing of a next processing phase of the select function.

3. The computer program product of claim 1, wherein the continuing with performing instruction processing comprises ending the instruction.

4. The computer program product of claim 1, wherein the designated area comprises an area of memory defined by a starting address and an ending address, wherein the starting address and the ending address are provided by one or more control registers.

5. The computer program product of claim 1, wherein the determining whether the store into the designated area occurred comprises checking whether a memory address to which data is being written is in the designated area, wherein based on the memory address being in the designated area the determining indicates that there is a store into the designated area.

6. The computer program product of claim 1, wherein the determining whether the store into the designated area occurred comprises checking whether at least a portion of a parameter block to be used by the select function overlaps the designated area, wherein based on the at least a portion of the parameter block overlapping the designated area the determining indicates that there is a store into the designated area.

7. The computer program product of claim 1, wherein the determining whether the store into the designated area occurred comprises checking whether at least a portion of a function specific save area to be used by the select function overlaps the designated area, wherein based on the at least a portion of the function specific save area overlapping the designated area the determining indicates that there is a store into the designated area.

8. The computer program product of claim 1, wherein the method further comprises predicting that a particular processing phase of the plurality of processing phases of the select function will cause an interrupt, the predicting being based on a memory access pattern of the select function.

9. The computer program product of claim 1, wherein the method further comprises predicting that an interrupt will occur based on determining that at least a portion of a parameter block to be used by the select function overlaps the designated area.

10. The computer program product of claim 1, wherein the method further comprises predicting that an interrupt will occur based on determining that at least a portion of a function specific save area to be used by the function overlaps the designated area.

11. A computer system for facilitating processing within a computing environment, the computer system comprising:
   a memory; and
   at least one processor in communication with the memory, wherein the computer system is configured to perform a method, said method comprising:
      performing instruction processing for an instruction, the instruction configured to perform a plurality of functions, wherein a function of the plurality of functions is to be performed in a plurality of processing phases, wherein a processing phase of the plurality of processing phases is defined to store up to a select amount of data, the select amount of data being based on the function of the plurality of functions to be performed, wherein at least one function of the plurality of functions has a different value for the select amount of data than at least one other function of the plurality of functions;
      determining whether a store into a designated area occurred based on processing a select processing phase of the plurality of processing phases of a select function;
      presenting an interrupt, based on determining that the store into the designated area occurred; and
      continuing with performing instruction processing, based on determining that the store into the designated area did not occur.

12. The computer system of claim 11, wherein the determining whether the store into the designated area occurred comprises checking whether a memory address to which data is being written is in the designated area, wherein based on the memory address being in the designated area the determining indicates that there is a store into the designated area.

13. The computer system of claim 11, wherein the determining whether the store into the designated area occurred comprises checking whether at least a portion of a parameter block to be used by the select function overlaps the designated area, wherein based on the at least a portion of the parameter block overlapping the designated area the determining indicates that there is a store into the designated area.

14. The computer system of claim 11, wherein the determining whether the store into the designated area occurred comprises checking whether at least a portion of a function specific save area to be used by the select function overlaps the designated area, wherein based on the at least a portion of the function specific save area overlapping the designated area the determining indicates that there is a store into the designated area.

15. The computer system of claim 11, wherein the method further comprises predicting that a particular processing phase of the plurality of processing phases of the select function will cause an interrupt, the predicting being based on a memory access pattern of the select function.

16. A computer-implemented method of facilitating processing within a computing environment, the computer-implemented method comprising:
   performing instruction processing for an instruction, the instruction configured to perform a plurality of functions, wherein a function of the plurality of functions is to be performed in a plurality of processing phases, wherein a processing phase of the plurality of processing phases is defined to store up to a select amount of data, the select amount of data being based on the function of the plurality of functions to be performed, wherein at least one function of the plurality of functions has a different value for the select amount of data than at least one other function of the plurality of functions;
   determining whether a store into a designated area occurred based on processing a select processing phase of the plurality of processing phases of a select function;
   presenting an interrupt, based on determining that the store into the designated area occurred; and
   continuing with performing instruction processing, based on determining that the store into the designated area did not occur.

17. The computer-implemented method of claim 16, wherein the determining whether the store into the designated area occurred comprises checking whether a memory address to which data is being written is in the designated area, wherein based on the memory address being in the designated area the determining indicates that there is a store into the designated area.

18. The computer-implemented method of claim 16, wherein the determining whether the store into the designated area occurred comprises checking whether at least a portion of a parameter block to be used by the select function overlaps the designated area, wherein based on the at least a portion of the parameter block overlapping the designated area the determining indicates that there is a store into the designated area.

19. The computer-implemented method of claim 16, wherein the determining whether the store into the designated area occurred comprises checking whether at least a portion of a function specific save area to be used by the select function overlaps the designated area, wherein based on the at least a portion of the function specific save area overlapping the designated area the determining indicates that there is a store into the designated area.

20. The computer-implemented method of claim 16, further comprises predicting that a particular processing phase of the plurality of processing phases of the select function will cause an interrupt, the predicting being based on a memory access pattern of the select function.

* * * * *